US008703308B2

(12) United States Patent
Maeda

(10) Patent No.: US 8,703,308 B2
(45) Date of Patent: Apr. 22, 2014

(54) MAGNETIC RECORDING MEDIUM, METHOD OF MANUFACTURING THE SAME, AND MAGNETIC RECORDING/REPRODUCTION APPARATUS

(75) Inventor: Tomoyuki Maeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 65 days.

(21) Appl. No.: 13/269,047

(22) Filed: Oct. 7, 2011

(65) Prior Publication Data

US 2012/0134049 A1 May 31, 2012

(30) Foreign Application Priority Data

Nov. 26, 2010 (JP) ................................ 2010-263382
May 27, 2011 (JP) ................................ 2011-119190

(51) Int. Cl.
*G11B 5/73* (2006.01)
*G11B 5/738* (2006.01)

(52) U.S. Cl.
USPC ........................ 428/831.2; 428/674; 428/675

(58) Field of Classification Search
None
See application file for complete search history.

(56) References Cited

U.S. PATENT DOCUMENTS

| 7,195,827 | B2 * | 3/2007 | Maeda et al. | 428/831 |
| 7,211,340 | B2 * | 5/2007 | Nolan | 428/831.2 |
| 7,247,396 | B2 * | 7/2007 | Nolan et al. | 428/831.2 |
| 7,416,794 | B2 * | 8/2008 | Maeda et al. | 428/832 |
| 7,618,722 | B2 * | 11/2009 | Hirayama et al. | 428/831.2 |
| RE41,282 | E * | 4/2010 | Uwazumi et al. | 428/831.2 |
| 7,862,915 | B2 * | 1/2011 | Maeda et al. | 428/831.2 |
| 7,892,664 | B2 * | 2/2011 | Lu | 428/831.2 |
| 7,989,097 | B2 * | 8/2011 | Maeda | 428/831.2 |
| 2006/0269794 | A1 * | 11/2006 | Oikawa | 428/831.2 |

FOREIGN PATENT DOCUMENTS

| JP | 08-221734 | 8/1996 |
| JP | 2002-083411 | 3/2002 |
| JP | 2005-276363 | 10/2005 |
| JP | 2005-276365 | 10/2005 |
| JP | 2005-302150 | 10/2005 |
| JP | 2006294121 A | 10/2006 |
| JP | 2007-172704 | 7/2007 |
| JP | 2008091024 A | 4/2008 |
| JP | 4416408 | 2/2010 |
| WO | 03085649 A1 | 10/2003 |

OTHER PUBLICATIONS

Japanese Office Action dated Jul. 10, 2012, filed in Japanese counterpart Application No. 2011-119190, 5 pages.
Dieter Suess, et al., "Micromagnetic study of pinning behavior in percolated media", Journal of Applied Physics 99, 08G905 (2006).
Christoph Brombacher, et al., "Tailoring particle arrays by isotropic plasma etching: an approach towards percolated perpendicular media", Nanotechnology 20 (2009) 105304, (5pp).

* cited by examiner

*Primary Examiner* — Kevin Bernatz
(74) *Attorney, Agent, or Firm* — Patterson & Sheridan, LLP

(57) ABSTRACT

According to one embodiment, a magnetic recording medium includes a substrate, a soft magnetic layer, a multilayered underlayer formed on the soft magnetic layer, and a continuous film type magnetic recording layer formed on the multilayered underlayer. The multilayered underlayer includes a first underlayer made of copper and containing crystal grains having a (100)-oriented, face-centered cubic lattice structure, a second underlayer formed on the first underlayer and made of copper and nitrogen, and a third underlayer formed into islands on the second underlayer. The continuous film type magnetic recording layer contains at least one element selected from Fe and Co and at least one element selected from Pt and Pd, has the $L1_0$ structure, and mainly contains (001)-oriented magnetic crystal grains.

37 Claims, 4 Drawing Sheets

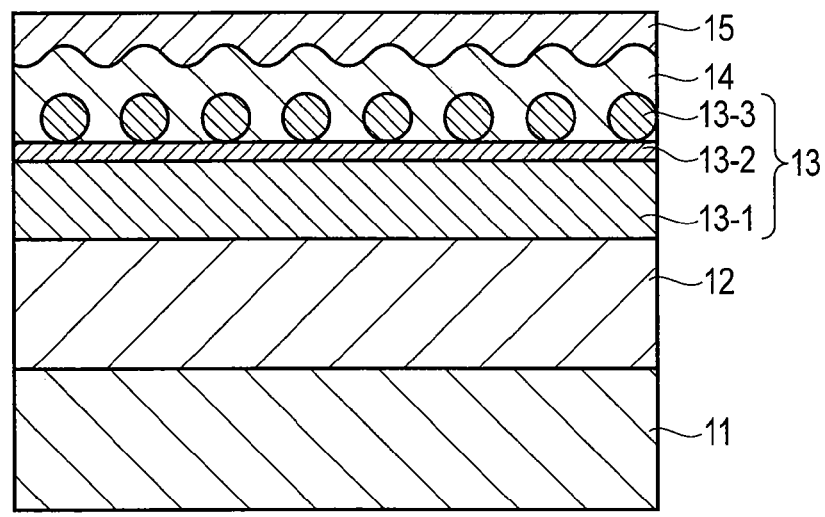
F I G. 1
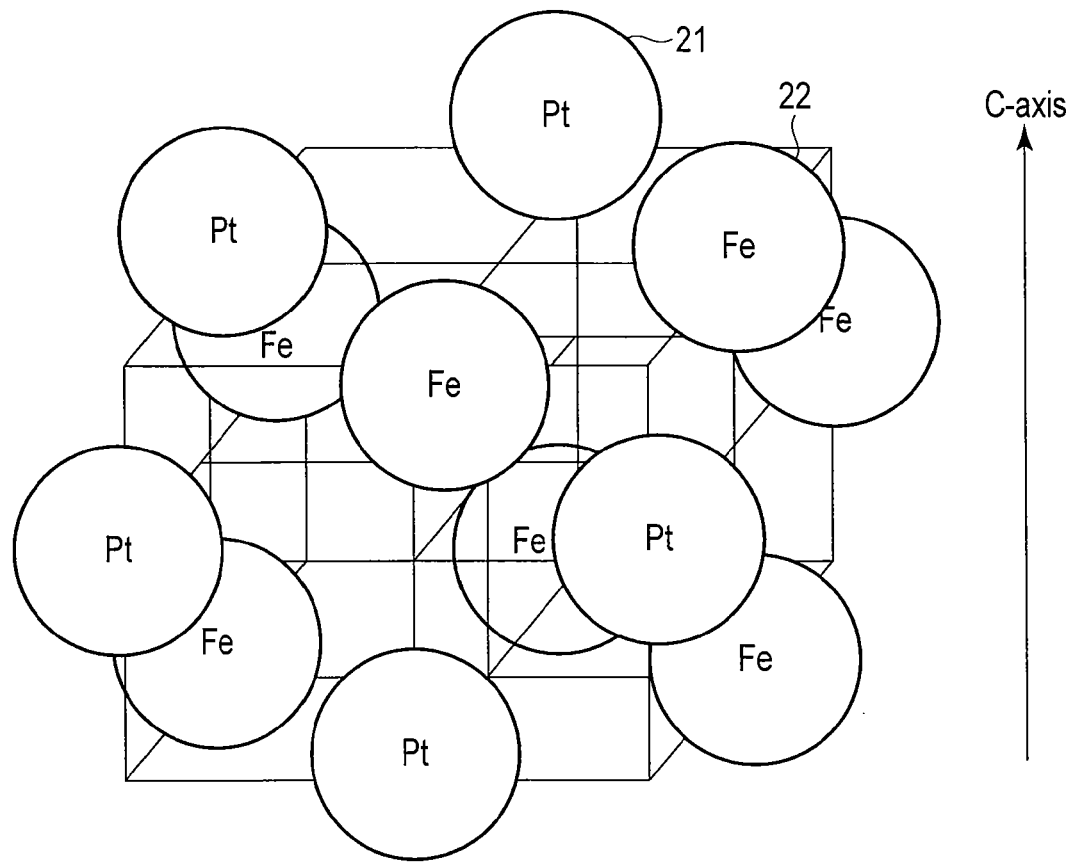
F I G. 2

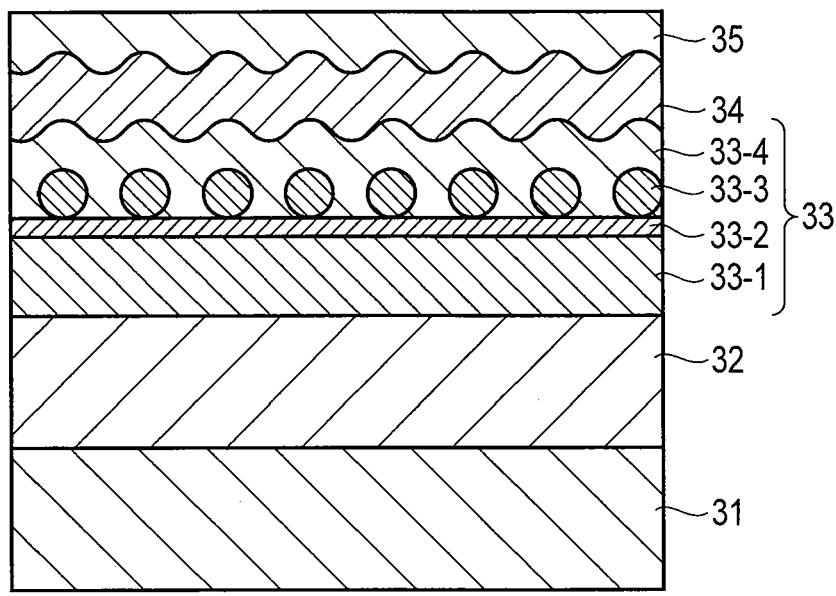
F I G. 3
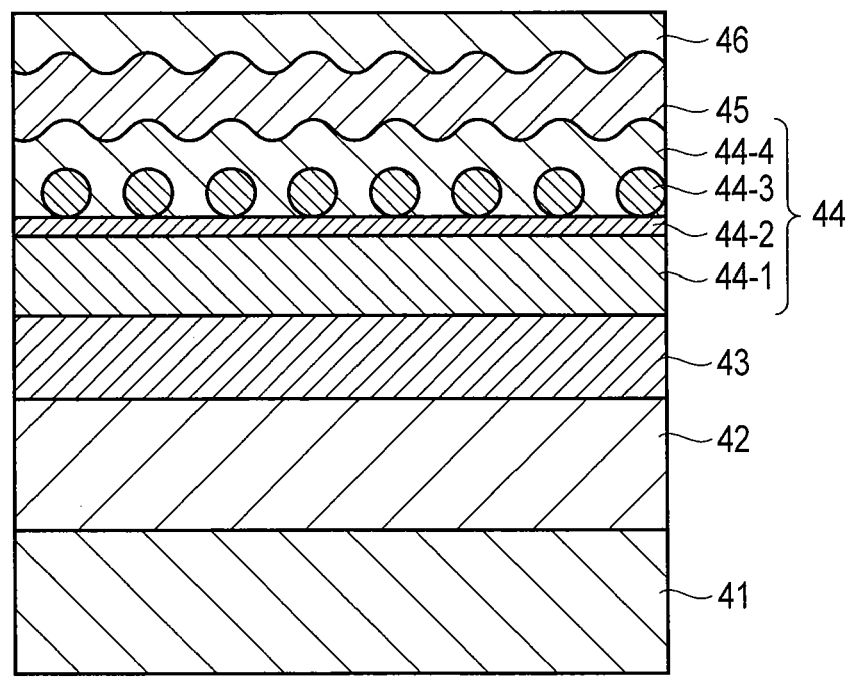
F I G. 4

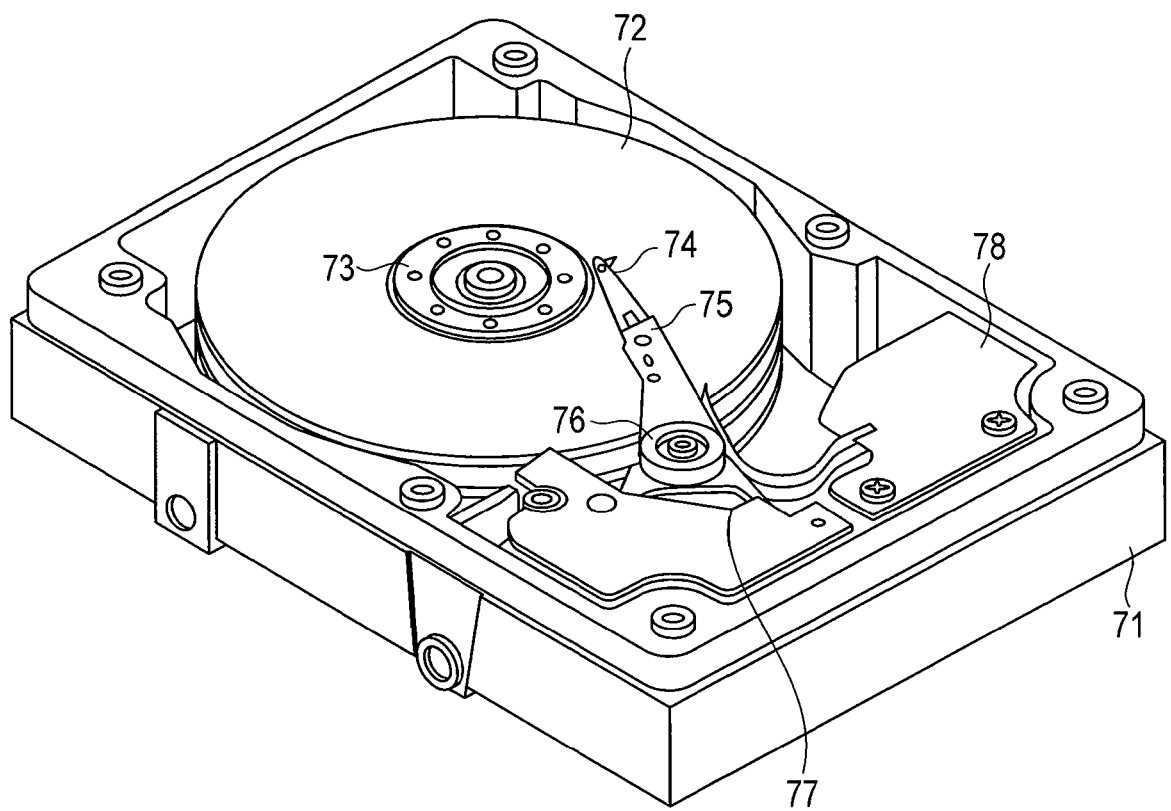
F I G. 7

US 8,703,308 B2

MAGNETIC RECORDING MEDIUM, METHOD OF MANUFACTURING THE SAME, AND MAGNETIC RECORDING/REPRODUCTION APPARATUS

CROSS-REFERENCE TO RELATED APPLICATIONS

This application is based upon and claims the benefit of priority from prior Japanese Patent Applications No. 2010-263382, filed Nov. 26, 2010; and No. 2011-119190, filed May 27, 2011, the entire contents of all of which are incorporated herein by reference.

FIELD

Embodiments described herein relate generally to a magnetic recording medium, a method of manufacturing the same, and a magnetic recording/reproduction apparatus.

BACKGROUND

Magnetic memory devices (HDDs) mainly used in computers to record and reproduce information have large capacities, inexpensiveness, high data access speeds, high data holding reliability, and the like, and hence are used in various fields such as household video decks, audio apparatuses, and automobile navigation systems. As the range of applications of the HDDs extends, demands for large storage capacities increase, and high-density HDDs are more and more extensively developed in recent years.

As a magnetic recording method of presently commercially available HDDs, a so-called perpendicular magnetic recording method is recently most frequently used. In the perpendicular magnetic recording method, magnetic crystal grains forming a magnetic recording layer for recording information have an axis of easy magnetization in a direction perpendicular to a substrate. The axis of easy magnetization is an axis in the direction of which magnetization easily points. In a Co-based alloy presently widely used as a magnetic recording layer material, the axis of easy magnetization is the axis (c-axis) parallel to the normal to the (0001) plane of the hcp structure of Co. In an ordered alloy having the $L1_0$ structure such as FePt, the axis of easy magnetization is the axis (c-axis) parallel to the normal to the (001) plane. As a recording layer of the existing perpendicular magnetic recording medium, a granular film type recording layer having a so-called granular structure in which magnetic crystal grains are surrounded by a grain boundary region made of a nonmagnetic material is widely used. The granular film type recording layer has a structure in which magnetic crystal grains are two-dimensionally, physically isolated by a nonmagnetic grain boundary region, so the magnetic exchange interaction acting between the magnetic grains reduces. In this recording layer, the lower limit of the recording bit size strongly depends on the magnetic crystal grain size of the granular film type recording layer. To increase the recording density, therefore, the magnetic crystal grain size must be decreased. If the exchange interaction between the magnetic crystal grains is very small, however, decreasing the magnetic crystal grain size deteriorates the thermal stability. On the other hand, to maintain the thermal stability of recording magnetization while decreasing the grain size of the magnetic crystal grains, a method of increasing the magnetic anisotropic energy (Ku) of the magnetic crystal grains can be used. However, the increase in Ku increases the magnetic anisotropic field (Hk). In the granular film type recording layer, the increase in Hk increases the coercive force (Hc). This increases a magnetic field required for magnetization reversal. That is, when increasing the recording density of the existing perpendicular magnetic recording medium, it is impossible to simultaneously solve the three problems, i.e., decreasing the recording bit size, maintaining the thermal stability of recording magnetization, and maintaining (reducing) the recording magnetic field. That is, a so-called "trilemma" occurs.

As a means for solving this "trilemma", a novel magnetic recording medium called a percolated medium has recently been proposed. Unlike the granular film type recording layer, a recording layer of the percolated medium has a continuous-film-like grain structure in which magnetic crystal grains are not surrounded by a nonmagnetic grain boundary region, and a strong exchange interaction acts between the magnetic crystal grains. Pinning sites for pinning magnetic domain walls are formed in the recording layer of the percolated medium by some method, thereby suppressing the spread of the domain walls. This forms a fine magnetic domain structure corresponding to the density of the pinning sites. The recording bit size is decreased by forming these pinning sites at a density higher than that of the magnetic crystal grains in the existing granular film type recording layer. In the percolated medium recording layer, the recording bit size is independent of the magnetic crystal grain size. Unlike the granular film type recording layer, therefore, the magnetic crystal grain size need not be decreased, and this makes it possible to maintain the thermal stability and decrease the recording bit size at the same time. Also, since the magnetization reversing mechanism differs from that of the granular film type recording layer, the recording magnetic field hardly increases even when the Ku of the magnetic crystal grains is increased. As described above, the percolated medium is an epoch-making magnetic recording medium that can overcome the "trilemma" when increasing the recording density of the HDD medium.

Since, however, no practical means for forming fine pinning sites at a high density in a continuous magnetic film has been developed at present, no percolated medium has been put into practical use.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a sectional view showing an example of a magnetic recording medium according to an embodiment;

FIG. 2 is a view for explaining the $L1_0$ structure of a magnetic recording layer used;

FIG. 3 is a sectional view showing another example of the magnetic recording medium according to the embodiment;

FIG. 4 is a sectional view showing still another example of the magnetic recording medium according to the embodiment;

FIG. 7 is a partially exploded perspective view showing an example of a magnetic recording/reproduction apparatus.

DETAILED DESCRIPTION

Figure 5:
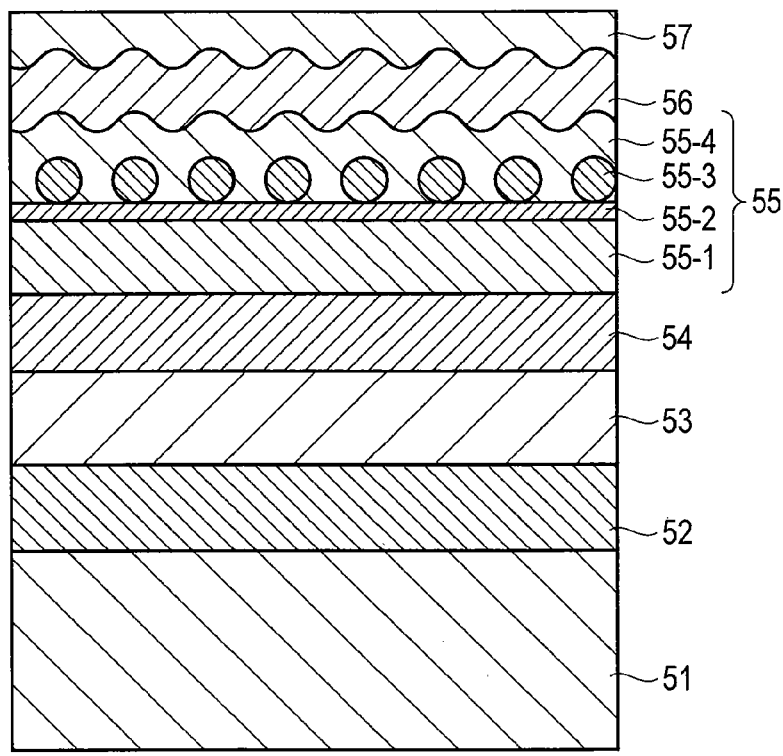
FIG. 5 is a sectional view showing still another example of the magnetic recording medium according to the embodiment.

Various embodiments will be described hereinafter with reference to the accompanying drawings.

In general, according to one embodiment, there is provided a magnetic recording medium including
a substrate,
a soft magnetic layer formed on the substrate,
a multilayered underlayer,
a continuous film type magnetic recording layer formed on the multilayered underlayer, containing at least one element selected from Fe and Co and at least one element selected from Pt and Pd, having the $L1_0$ structure, and mainly containing (001)-oriented magnetic crystal grains, and
a protective layer formed on the magnetic recording layer.

The multilayered underlayer includes a first nonmagnetic underlayer formed on the soft magnetic layer, made of copper, and containing crystal grains having a (100)-oriented, face-centered cubic lattice structure,
a second underlayer formed on the first underlayer and made of copper and nitrogen, and
a third underlayer formed into islands on the second underlayer.

A magnetic recording medium manufacturing method according to the embodiment includes
preparing a substrate, forming a soft magnetic layer on the substrate, and forming a multilayered underlayer on the soft magnetic layer, and
forming a continuous film type magnetic recording layer on the multilayered underlayer.

The multilayered underlayer includes first to third underlayers.

First, the first underlayer containing crystal grains made of copper and having a (100)-oriented, face-centered cubic lattice structure is formed on the soft magnetic layer. Then, the second underlayer made of copper and nitrogen is formed on the first underlayer by exposing the surface of the first underlayer to nitrogen-containing ions or a nitrogen-containing plasma. Subsequently, the third underlayer is formed into islands on the second underlayer, thereby forming the multilayered underlayer including the first, second, and third underlayers.

The continuous film type magnetic recording layer contains at least one element selected from Fe and Co and at least one element selected from Pt and Pd, has the $L1_0$ structure, and mainly contains (001)-oriented magnetic crystal grains.

A magnetic recording/reproduction apparatus according to the embodiment includes the above-described magnetic recording medium and a recording/reproduction head.

In the embodiment, fine pinning sites can be formed at a high density in the continuous film type magnetic recording layer by forming the island-like third underlayer. This also makes it possible to obtain a magnetic recording medium having a high signal-to-noise ratio (SNR) and a high thermal decay resistance. Furthermore, high-density recording is possible because a write magnetic field when performing magnetic recording can be reduced.

FIG. 1 is a sectional view showing the first example of the magnetic recording medium according to this embodiment.

As shown in FIG. 1, a magnetic recording medium 10 has a structure in which a soft magnetic layer 12, a multilayered underlayer 13 including a first underlayer 13-1, second underlayer 13-2, and third underlayer 13-3, a magnetic recording layer 14, and a protective layer 15 are sequentially stacked on a substrate 11.

As a nonmagnetic substrate of the magnetic recording medium according to the embodiment, it is possible to use, e.g., a glass substrate, an Al-based alloy substrate, an Si single-crystal substrate having an oxidized surface, ceramics, or plastic. In addition, the same effect is expected even when the surface of any of these nonmagnetic substrates is plated with an NiP alloy or the like.

In the magnetic recording medium according to the embodiment, a high-permeability soft magnetic layer is formed on the substrate. The soft magnetic layer horizontally passes a recording magnetic field from a magnetic head such as a single pole head for magnetizing the perpendicular magnetic recording layer, and returns the recording magnetic field to the magnetic head, thereby performing a part of the function of the magnetic head. Thus, the soft magnetic layer can increase the recording/reproduction efficiency by applying a sufficiently steep perpendicular magnetic field to the magnetic field recording layer.

Examples of the soft magnetic layer as described above are CoZrNb, CoB, CoTaZr, FeSiAl, FeTaC, CoTaC, NiFe, Fe, FeCoB, FeCoN, and FeTaN.

The soft magnetic layer can also be a multilayered film including two or more layers. In this case, the materials, compositions, and film thicknesses of the individual layers may be different. The soft magnetic layer can also have a triple-layered structure obtained by sandwiching a thin Ru layer between two soft magnetic layers.

To improve the mechanical adhesion between the substrate and soft magnetic layer, a nonmagnetic adhesion layer may be formed between the substrate and soft magnetic layer. As the nonmagnetic adhesion layer, it is possible to use, e.g., Cr, Ti, or an alloy of Cr or Ti.

The purpose of the underlayer according to the embodiment is to, e.g., form high-density, fine pinning sites in the magnetic recording layer. The underlayer also has a function of improving the crystal orientation of the magnetic recording layer, a function of promoting the ordering of the magnetic recording layer, and a function of controlling the crystal grain size of the magnetic recording layer.

The underlayer has a multilayered structure including at least three layers.

As the first underlayer, a nonmagnetic material made of (100)-oriented Cu is used. When using the underlayer made of (100)-oriented Cu having a face-centered cubic crystal structure, the C-axis as the axis of easy magnetization of the crystal grains of the recording layer material (to be described later) can be oriented perpendicularly to the substrate surface.

The first underlayer can have a thickness of 3 to 20 nm. If the thickness is less than 3 nm, the (001) orientation of the magnetic crystal grains in the magnetic recording layer often degrades. If the thickness exceeds 20 nm, the distance from the surface of the magnetic recording medium to the soft magnetic layer increases. This often decreases the SNR of the recording/reproduction characteristics.

The Cu metal grains contained in the first underlayer can have an average crystal grain size of 15 nm or more. When the average crystal grain size of the Cu underlayer is 15 nm or more, it is possible to enlarge the average crystal grains in the magnetic recording layer, and obtain a uniform magnetic domain structure as will be described later. The average crystal grain size of the Cu underlayer can be 50 nm or more. Furthermore, the Cu underlayer can be a single-crystal film having no crystal grain boundary.

The (100) orientation of the Cu crystal grains can be improved by heating the substrate before and/or after the first underlayer is deposited.

The orientation plane of the crystal grain in each layer can be evaluated by a so-called θ-2θ method by using, e.g., a general X-ray diffractometer (XRD). Also, the orientation dispersion can be evaluated by the half-width Δθ50 of the rocking curve.

The average crystal grain size of each layer can be evaluated by observing the surface of the layer by using TEM. In the present invention, the areas of 200 crystal grains are evaluated from a plane TEM image, the radius of each crystal grain is approximated to that of a circle having the same area as the area of the grain, and the average of the radii is regarded as the average crystal grain size.

The second underlayer is formed on the first underlayer by using a material made of Cu and nitrogen. An example of a method of forming the second underlayer made of Cu and nitrogen on the first underlayer made of Cu is a method by which after the first underlayer made of Cu is deposited, a modified layer containing Cu and nitrogen is formed in the surface region of the first underlayer by exposing the surface of the first underlayer to a nitrogen plasma or nitrogen radicals. Likewise, it is also possible to use a method of lightly sputtering the surface of a Cu layer in a nitrogen ambient, i.e., a so-called reverse sputtering method. A method of forming the second underlayer by depositing Cu on the first underlayer by reactive sputtering using nitrogen gas can also be used. Furthermore, it is possible to use a method of irradiating the surface of a Cu layer with N ions by using an ion gun.

By thus forming the second underlayer, the surface energy of the Cu layer changes. As a consequence, the third underlayer material (to be described later) does not grow as a continuous film but intermittently grows into islands on the surface of the second underlayer. When the second underlayer is appropriately thin, the Cu (100)-plane crystal structure of the first underlayer can be reflected on the upper layer. This makes it possible to maintain the above-described recording layer C-axis orientation.

Whether the second underlayer containing Cu and nitrogen exists on the first underlayer can be confirmed by using, e.g., medium section observation using, e.g., TEM and EDX together. The existence of the second underlayer can also be confirmed by analyzing means such as secondary ion mass spectrometry (SIMS), Rutherford backscattering spectrometry (RBS), X-ray photoelectron spectroscopy (XPS), Auger electron spectroscopy (AES), and a three-dimensional atom probe method.

The thickness of the second underlayer can be confirmed by, e.g., observing the medium surface by using TEM. When a modified layer containing nitrogen is formed in the surface region of a Cu underlayer, this Cu underlayer as the first underlayer and the modified layer as the second underlayer are different in composition and crystallinity. Since this produces a contrast difference between the two layers in a TEM image, the thickness of the modified layer can be evaluated.

The second underlayer can have a thickness of 0.1 to 3 nm. If the thickness is larger than 3 nm, the (001) orientation of the magnetic crystal grains in the perpendicular magnetic recording layer tends to deteriorate. If the thickness is smaller than 0.1 nm, the third underlayer tends to grow like a continuous film instead of islands. It was revealed by experiments that the second underlayer can be formed to have a film thickness of 1 to 2 nm.

The third underlayer can be selected from, e.g., Ag, Au, Ir, Co, and Fe. The third underlayer is formed to be isolated into islands on the second underlayer. Generally, none of these materials grows into islands but they grow like a continuous film on the surface of a metal such as Cu. However, the present inventors made extensive studies and have found that each material does not grow like a continuous film but forms an isolated island structure on the surface of a second underlayer containing Cu and nitrogen. An island structure herein mentioned indicates a structure in which individual crystal grains having a grain size of about a few nm do not aggregate but grow as they are isolated from each other while maintaining air gaps. Accordingly, a rugged structure including the crystal grains in the third underlayer and the surface of the second underlayer is formed on the film surface immediately after the third underlayer is formed. Unlike the island structure, a grain boundary region made of a deposit is filled between individual crystal grains in a granular structure. Generally, therefore, the rugged structure as described above is not formed on the surface of a granular film.

Whether the third underlayer forms an isolated island structure can be confirmed by, e.g., observing the medium surface by using TEM.

As described above, the third underlayer is obtained by intermittently forming isolated islands of crystal grains having a grain size of a few nm on the second underlayer. This means that a rugged structure having a height of a few nm is formed on the surface of the second underlayer. When another layer such as a magnetic recording layer is further stacked on the underlayer having this surface rugged structure, the magnetic recording layer grows along the above-described surface rugged structure, so a rugged structure reflecting the island structure of the third underlayer is formed on the surface of the magnetic recording layer as well. That is, the rugged structure of the third underlayer is transmitted to the magnetic recording layer, and fine protrusions and recesses are formed at a high density in the magnetic recording layer, and function as pinning sites. Note that protrusions and recesses formed below a magnetic layer reportedly function as pinning sites of the magnetic layer. However, large magnetic domains are formed because the period of the protrusions and recesses is as very large as a few ten nm or more. By contrast, the protrusions and recesses formed by the underlayer according to the embodiment have a period of a few nm, i.e., they are very fine and have a high density. This makes it possible to form very fine magnetic domains in the magnetic recording layer.

The average grain size of the third underlayer can be made smaller than that of the magnetic recording layer. If the average grain size of the third underlayer is larger than that of the magnetic recording layer, the function as pinning sites often deteriorates. The average grain size of the third underlayer can be, e.g., 1 to 5 nm, and can also be 3 to 4 nm. If the average grain size of the third underlayer is less than 1 nm, the sizes of the protrusions and recesses formed by the island structure decrease, so the function as pinning sites tends to degrade. If the average grain size exceeds 5 nm, the crystal grains aggregate and form a continuous film structure. Since this decreases the sizes of the protrusions and recesses formed by the island structure, the function as pinning sites often deteriorates.

Furthermore, if air gaps between the crystal grains in the third underlayer are sufficiently wide, the magnetic recording layer sometimes comes in contact with both the second and third underlayers. The growth of the islands is sometimes promoted when heating the substrate before and/or after the third underlayer is deposited.

The magnetic recording layer of the magnetic recording medium according to the embodiment is made of a material including magnetic crystal grains having the $L1_0$ structure and mainly oriented in the (001) plane, and containing a magnetic metal element and noble metal element as main components. The magnetic metal element is at least one element selected from the group consisting of Fe and Co. The noble metal element is at least one element selected from the group consisting of Pt and Pd.

FIG. 2 is a view showing the $L1_0$ structure of the magnetic recording layer according to the embodiment.

As shown in FIG. 2, the $L1_0$ structure is a crystal structure in which hetero atoms such as Fe 22 and Pt 21 are alternately orderly arranged at the lattice points of a face-centered cubic lattice along a plane perpendicular to a given crystal axis, e.g., the C-axis in this case. In a disordered phase having no ordered structure, however, the crystal structure has a face-centered cubic lattice, and atoms occupy lattice points at random.

Whether the crystal grains forming the magnetic recording layer have the $L1_0$ structure can be confirmed by a general X-ray diffractometer. The $L1_0$ structure presumably exists if a peak (ordered lattice reflection) indicating a plane that is not observed in a disordered face-centered cubic lattice (FCC) can be observed at a diffraction angle matching the interplanar spacing.

In this magnetic recording medium, high-density pinning sites are formed in the magnetic recording layer by the fine protrusions and recesses formed on the underlayer surface, thereby downsizing the magnetic domains. However, if the magnetic domain wall width in the magnetic recording layer is not as small as the pinning site diameter, the magnetic domain walls become difficult to pin. To sufficiently decrease the magnetic domain wall width, the Ku of the magnetic recording layer must be increased. The above-mentioned alloy can achieve a large Ku of $7 \times 10^7$ erg/cc. This enables the fine protrusions and recesses to function as pinning sites, and makes it possible to downsize the magnetic domains.

The composition ratios of the magnetic metal element to the noble metal element described above in the magnetic recording layer are as follows. That is, in an Fe—Pt binary alloy, the Pt content can be 35 to 65 atomic %. In an Fe—Pd binary alloy, the Pd content can be 40 to 63 atomic %. In a Co—Pt binary alloy, the Pt content can be 40 to 70 atomic %. When the composition ratio of each alloy falls within this range, the $L1_0$ structure is formed, and a large Ku can be achieved.

In the continuous film type magnetic recording layer according to the embodiment, the magnetization reversal unit is defined not by each individual magnetic crystal grain but by the region surrounded by the above-described pinning sites, unlike the conventional granular type magnetic recording layer. Therefore, the magnetic characteristics are desirably uniform in the region surrounded by the pinning sites. That is, the region surrounded by the pinning sites desirably contains as little a grain boundary as possible. Accordingly, the grain structure of the magnetic recording layer can be a good continuous film structure in which a strong exchange interaction acts between the magnetic crystal grains, when compared to the granular structure in which the individual magnetic crystal grains are magnetically isolated as in the conventional magnetic recording medium. A continuous film structure herein mentioned is a structure which has no such clear grain boundary region as that of the granular structure, and in which most crystal grains are in direct contact with adjacent grains and only a very narrow grain boundary exists. That is, it is possible to form a structure in which the area ratio occupied by the magnetic crystal grains in the film surface of the magnetic recording layer is high.

More specifically, the grain filling ratio in the film surface of the magnetic recording layer can be 95% or more.

The grain filling ratio herein mentioned is defined as the ratio of the sum of the areas of the crystal grains in the film surface to (the sum of the areas of the crystal grains)+(the sum of the areas of the grain boundaries).

For the same reason, the average crystal grains in the magnetic recording layer can be enlarged. More specifically, the magnetic crystal grains in the magnetic recording layer can have an average grain size of 15 nm or more. When the average crystal grain size of the magnetic recording layer is 15 nm or more, it is possible to relatively reduce pinning sites which are formed on the grain boundary in which the magnetic exchange interaction decreases, and deteriorate the domain wall pinning effect. This makes it possible to form a more uniform magnetic domain structure. The average grain size can also be 50 nm or more. Furthermore, a single-crystal film having no crystal grain boundary can be formed.

As described above, the grain structure required of the magnetic recording layer of the magnetic recording medium according to the embodiment is obviously different from that of the magnetic recording layer of the conventional magnetic recording medium required to downsize the magnetic crystal grains and magnetically isolate the crystal grains.

The thickness of the magnetic recording layer is determined by a required value of a magnetic recording/reproduction system, and can be 1 to 20 nm. The thickness of the magnetic recording layer can also be 3 to 10 nm. If the thickness is smaller than 1 nm, a continuous film is often difficult to form. If the thickness is larger than 20 nm, the distance from the surface of the magnetic recording medium to the soft magnetic layer increases, and this often decreases the SNR among the recording/reproduction characteristics.

FIG. 3 is a sectional view showing another example of the magnetic recording medium according to the embodiment.

As shown in FIG. 3, a magnetic recording medium 30 has a structure in which a soft magnetic layer 32, a multilayered underlayer 33 including a first underlayer 33-1, second underlayer 33-2, third underlayer 33-3, and fourth underlayer 33-4, a magnetic recording layer 34, and a protective layer 35 are sequentially stacked on a substrate 31.

The order of crystal grains in the magnetic recording layer 34 can be improved by further inserting the fourth nonmagnetic underlayer 33-4 between the multilayered underlayer 33 and magnetic recording layer 34. The order herein mentioned is an index indicating the closeness of the actual crystal grain atomic arrangement to an ideal ordered atomic arrangement as shown in FIG. 2. As the order approaches 1, the atomic arrangement is closer to the ideal atomic arrangement. As the order approaches 0, the atomic arrangement is closer to a perfect disordered arrangement. The Ku of an ordered alloy having the $L1_0$ structure has a positive correlation with the order. Accordingly, the order can be increased in the magnetic recording layer 34 according to the embodiment. The order can be evaluated by general X-ray diffractometry.

The present inventors made extensive studies and have found that the order can be improved by using Pt or Pd as the fourth underlayer material.

The film thickness of the fourth underlayer can be 1 to 15 nm. If the film thickness is less than 1 nm, a marked order improving effect does not appear. If the film thickness exceeds 15 nm, it becomes difficult to transmit the ruggedness of the third underlayer to the magnetic recording layer. It was revealed by experiments that the film thickness can further be 3 to 10 nm.

Alternatively, the present inventors made extensive studies and have found that the diffusion of Cu into a magnetic recording medium can be prevented and Ku of the magnetic recording medium tends to be improved when nonmagnetic material such as (001)-oriented MgO, NiO, or TiN is used as the fourth underlayer material.

The fourth underlayer may have a film thickness of 1 to 10 nm when (001)-oriented MgO, NiO, or TiN is used as the fourth underlayer material. If the thickness is less than 1 nm, the effect of improvement of Ku is tended to be not remarkable. If the thickness is more than 10 nm, c-axis orientation dispersion is tended to be deteriorated. It was revealed by experiments that the film thickness can further be 2 to 5 nm.

FIG. 4 is a sectional view showing still another example of the magnetic recording medium according to the embodiment.

As shown in FIG. 4, a magnetic recording medium 40 has a structure in which a soft magnetic layer 42, a nonmagnetic orientation control layer 43, a multilayered underlayer 44 including a first underlayer 44-1, second underlayer 44-2, third underlayer 44-3, and fourth underlayer 44-4, a magnetic recording layer 45, and a protective layer 46 are sequentially stacked on a substrate 41.

As shown in FIG. 4, to improve the (100) orientation of Cu as the first underlayer 44-1, the nonmagnetic orientation control layer 43 can be formed between the soft magnetic layer 42 and first underlayer 44-1.

Practical examples are an NiAl alloy, MgO, and Cr.

Since it is relatively easy to preferentially orient these materials in the (100) plane, the (100) orientation of Cu can be improved by forming the nonmagnetic orientation control layer 43 below the first underlayer 44-1.

The film thickness of the nonmagnetic orientation control layer 43 can be 1 to 50 nm. If the film thickness is less than 1 nm, a notable (100) orientation improving effect of the first underlayer 44-1 does not appear. If the film thickness exceeds 50 nm, the distance from the surface of the magnetic recording layer 45 to the soft magnetic layer 42 increases. This often decreases the SNR among the recording/reproduction characteristics.

FIG. 5 is a sectional view showing still another example of the magnetic recording medium according to the embodiment.

As shown in FIG. 5, a magnetic recording medium 50 has a structure in which a soft magnetic layer 52, an amorphous seed layer 53, a nonmagnetic orientation control layer 54, a multilayered underlayer 55 including a first underlayer 55-1, second underlayer 55-2, third underlayer 55-3, and fourth underlayer 55-4, a magnetic recording layer 56, and a protective layer 57 are sequentially stacked on a substrate 51.

As shown in FIG. 5, to improve the (100) orientation of Cr as the nonmagnetic orientation control layer 54, the nonmagnetic seed layer 53 made of an amorphous alloy containing Ni can further be formed between the soft magnetic layer 52 and nonmagnetic orientation control layer 54.

As the amorphous alloy containing Ni, it is possible to use alloys such as Ni—Nb, Ni—Ta, Ni—Zr, Ni—Mo, and Ni—V alloys.

The Ni content in these alloys can be 20 to 70 atomic %. If the Ni content is less than 20 atomic % or exceeds 70 atomic %, an amorphous layer becomes difficult to form. The Ni content can further be 30 to 50 atomic %. When the Ni content falls within this range, the C-axis orientation of the ordered alloy crystal grains tends to further improve.

Also, oxygen can be supplied to the surface of the nonmagnetic seed layer 53 containing the amorphous alloy by exposing the surface of the nonmagnetic seed layer 53 to oxygen. This often further improves the (100) orientation of Cr as the nonmagnetic orientation control layer 54.

As a method of exposing the surface of the nonmagnetic seed layer 53 containing the amorphous alloy to oxygen, it is possible to use a method by which after the nonmagnetic seed layer 53 is deposited, a slight amount of oxygen gas is supplied to the deposition chamber, and the surface of the obtained nonmagnetic seed layer 53 is exposed to the oxygen ambient for a short time. It is also possible to use a method of exposing the surface to an ozone ambient, or a method of irradiating the underlayer surface with oxygen radials or oxygen ions.

The film thickness of the amorphous seed layer can be 1 to 10 nm. If the film thickness is less than 1 nm, a remarkable (100) orientation improving effect of the nonmagnetic orientation control layer does not appear. If the film thickness exceeds 10 nm, the distance from the surface of the magnetic recording layer 56 to the soft magnetic layer 52 increases. This often decreases the SNR among the recording/reproduction characteristics.

Figure 6:
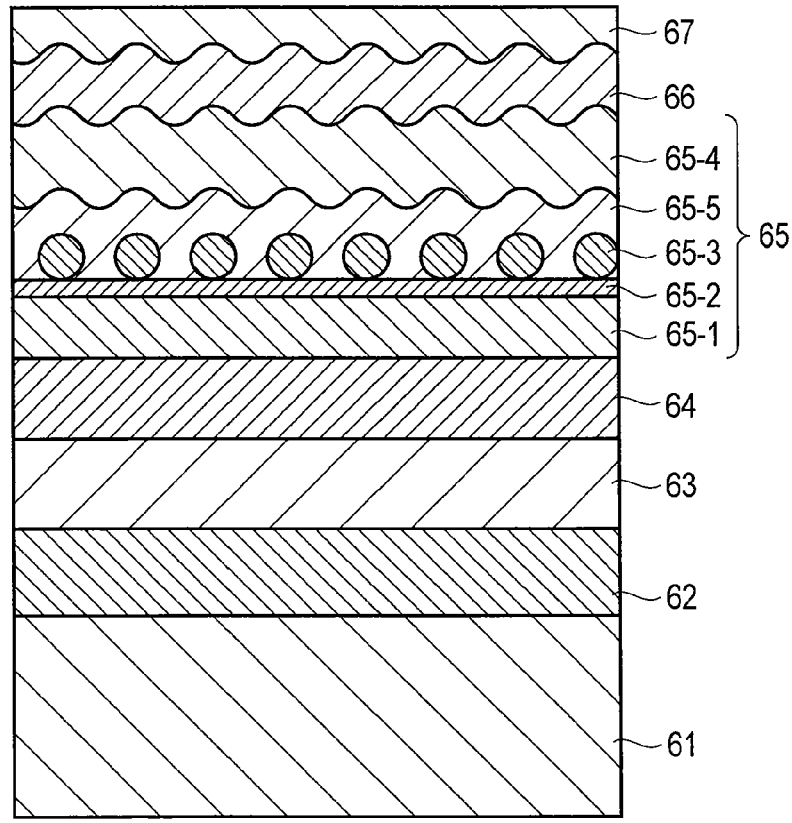
FIG. 6 is a sectional view showing still another example of the magnetic recording medium according to the embodiment.

FIG. 6 is a sectional view showing still another example of the magnetic recording medium according to the embodiment.

As shown in FIG. 6, a magnetic recording medium 60 has a structure in which a soft magnetic layer 62, an amorphous seed layer 63, a nonmagnetic orientation control layer 64, a multilayered underlayer 65 including a first underlayer 65-1, second underlayer 65-2, third underlayer 65-3, fifth underlayer 65-5, and fourth underlayer 65-4, a magnetic recording layer 66, and a protective layer 67 are sequentially stacked on a substrate 61.

The C-axis orientation of the magnetic recording layer crystal grains can further be improved by further inserting the fifth nonmagnetic underlayer 65-5 between the third underlayer 65-3 and fourth underlayer 65-4.

The present inventors made extensive studies and have found that as the material of the fifth underlayer 65-5, it is possible to use an alloy material containing Pt or Pd and one of Cr, Cu, and Ag.

It was found by experiments that the c-axis orientation of the magnetic recording layer crystal grains can notably improve when the Pt or Pd content in the above-mentioned alloy is 30 to 60 atomic %.

The protective layer 67 can be formed on the magnetic recording layer 66.

Examples of the protective layer 67 are C, diamond-like carbon (DLC), $SiN_x$, $SiO_x$, and $CN_x$.

As methods of forming the individual layers in the embodiment, it is possible to use, e.g., vacuum vapor deposition, sputtering, chemical vapor deposition, and laser abrasion. As sputtering, it is possible to favorably use, e.g., a single-target sputtering method using a composite target, and a multi-target simultaneous sputtering method using a plurality of targets of different elements. It is sometimes possible to advance the ordering of the magnetic recording layer by raising the substrate temperature to 200° C. to 500° C. before and during the deposition of the seed layer, underlayer, and magnetic recording layer.

FIG. 7 is a partially exploded perspective view of an example of the magnetic recording/reproduction apparatus according to the embodiment.

A rigid magnetic disk 72 for information recording according to the embodiment is mounted on a spindle 73, and rotated at a predetermined rotational speed by a spindle motor (not shown). A slider 74 carrying a recording head for recording information by accessing the magnetic disk 72 and an MR head for reproducing information is attached to the distal end of a suspension made of a thin leaf spring. This suspension is connected to one end of an arm 75 including, e.g., a bobbin for holding a driving coil (not shown).

A voice coil motor 77 as a kind of linear motor is formed at the other end of the arm 75. The voice coil motor 77 includes the driving coil (not shown) wound on the bobbin of the arm 75, and a magnetic circuit including a permanent magnet and counter yoke facing each other to sandwich the driving coil between them.

The arm 75 is held by ball bearings (not shown) formed in two, upper and lower portions of a fixing shaft 76, and swung by the voice coil motor 77. That is, the voice coil motor 77 controls the position of the slider 74 on the magnetic disk 72.

The embodiment will be explained in more detail below by way of its examples.

EXAMPLE 1

A nonmagnetic glass substrate (TS-10SX manufactured by OHARA) having the shape of a 2.5-inch hard disk was prepared.

The substrate was placed in a vacuum chamber of the c-3010 sputtering apparatus manufactured by ANELVA.

After the vacuum chamber of the sputtering apparatus was evacuated to $1 \times 10^{-5}$ Pa or less, a 50-nm thick Co-5atomic % Zr-5atomic % Nb alloy was deposited as a soft magnetic layer, and a 5-nm thick Ni-40atomic % Ta alloy was deposited as an amorphous seed layer.

Then, after the substrate surface was heated to 300° C. by using an infrared lamp heater, Ar-1atomic % $O_2$ gas was supplied into the vacuum chamber such that the internal pressure of the chamber was $5 \times 10^{-2}$ Pa, and the surface of the Ni-40atomic % Ta seed layer was exposed to this Ar/$O_2$ ambient for 5 sec. After that, 5-nm thick Cr was deposited as a nonmagnetic orientation control layer, and 10-nm thick Cu was deposited as a first nonmagnetic underlayer.

After the Cu layer was deposited, reverse sputtering was performed on the Cu surface, and nitrogen was supplied to the surface region of the Cu layer, thereby forming a second underlayer. The reverse sputtering to the Cu surface was performed by applying an RF power of 70 W to the Cu surface for 5 sec in a 3-Pa nitrogen ambient.

After the second underlayer was formed, Ag was deposited as a third underlayer. That is, Ag was deposited for 10 sec at a deposition rate of 0.05 nm/s as a continuous film deposition rate.

After that, a 5-nm thick Fe-50atomic % Pt alloy was deposited as a magnetic recording layer, and 5-nm thick C was deposited as a protective layer.

After the deposition, a lubricating layer was formed by coating the surface of the protective layer with a 13-Å thick perfluoropolyether (PFPE) lubricant by dipping, thereby obtaining a magnetic recording medium.

Note that Co-5atomic % Zr-5atomic % Nb, Ni-40atomic % Ta, Cr, Cu, Ag, Fe-50atomic % Pt, and C were deposited at an Ar pressure of 0.7 Pa by DC sputtering by respectively using Co-5atomic % Zr-5atomic % Nb, Ni-40atomic % Ta, Cr, Cu, Ag, Fe-50atomic % Pt, and C targets. The input power to each target was 1,000 W except for Ag.

COMPARATIVE EXAMPLE 1

As a comparative example, a magnetic recording medium not having the second and third underlayers was manufactured as follows.

The magnetic recording medium was manufactured following the same procedures as in Example 1 except that the reverse sputtering after the deposition of the first underlayer was not performed and the third underlayer was not deposited.

COMPARATIVE EXAMPLE 2

As a comparative example, a magnetic recording medium not having the third underlayer was manufactured as follows.

The magnetic recording medium was manufactured following the same procedures as in Example 1 except that the third underlayer was not deposited after the deposition of the second underlayer.

COMPARATIVE EXAMPLE 3

As a comparative example, a magnetic recording medium not having the second underlayer was manufactured as follows.

The magnetic recording medium was manufactured following the same procedures as in Example 1 except that the reverse sputtering after the deposition of the first underlayer was not performed.

The microstructures of the obtained magnetic recording media and the average crystal grain size of each layer were measured by observing planes and sections at an acceleration voltage of 400 kV by using a transmission electron microscope (TEM). The magnetic characteristics of the magnetic recording media were evaluated by a Kerr effect evaluation apparatus by using a laser source having a wavelength of 300 nm, under the conditions that the maximum applied magnetic field was 20 kOe and the magnetic field sweep rate was 133 Oe/s.

The distributions of Cu and nitrogen atoms in the direction of depth of each magnetic recording medium were measured by a secondary ion mass spectrometer (SIMS) using Cs + ions.

The X'pert-MRD X-ray diffractometer manufactured by Philips was used to identify the crystal orientation plane of each layer and measure the order of the magnetic recording layer by the θ-2θ method, and measure the crystal grain orientation dispersion Δθ50 of the magnetic recording layer by rocking curve measurement.

The R/W characteristics of the magnetic recording media were checked by using a spinstand. As a magnetic head, a combination of a single-pole head having a recording track width of 0.3 μm and an MR head having a reproduction track width of 0.2 μm was used.

The measurements were performed in a predetermined radius position of 20 mm, while the disk was rotated at 4,200 rpm.

As the medium SNR, the value of the signal-to-noise ratio (SNRm) (S is the output at a linear recording density of 119 kfci, and Nm is the value of rms (root mean square) at 716 kfci) of a differentiated waveform passed through a differentiating circuit is used.

The medium OW characteristic was evaluated by the reproduction output ratio (attenuation ratio) of a 119-kfci signal before and after a 250-kfci signal was overwritten after the 119-kfci signal was recorded.

The medium thermal decay resistance was evaluated by a ratio V1000/V0 of the reproduction output of a 100-kfci signal immediately after it was recorded to the reproduction output after the signal was left to stand for 1,000 sec, at a temperature of 70° C.

Evaluation of Results Obtained by X-Ray Diffractometer (XRD)

In any magnetic recording medium, the crystal grains in the first underlayer were oriented in the (100) plane.

In any magnetic recording medium, the crystal grains in the magnetic recording layer had the $L1_0$ structure and were (001)-oriented.

In any magnetic recording medium, the soft magnetic layer was amorphous.

In any magnetic recording medium, the amorphous seed layer was amorphous.

Results of SIMS

In the magnetic recording media of Example 1 and Comparative Example 2, a layer containing Cu and N as main components existed between the Cu underlayer and its upper layer. By contrast, no such layer was found in the magnetic recording media of Comparative Examples 1 and 3.

Results of Plane TEM Observation

The magnetic recording layer of any magnetic recording medium had the continuous film structure instead of the granular structure.

Results of Cross-Section TEM Observation

In the media of Example 1 and Comparative Example 2, a 1-nm thick layer having a different contrast was formed on the Cu underlayer. By contrast, no such layer was formed in the media of Comparative Examples 1 and 3.

Also, in the magnetic recording medium of Example 1, Ag grains having an average grain size of 4 nm were intermittently formed into islands at an average pitch of about 5 nm between the above-mentioned layer having a different contrast and the magnetic recording layer. On the other hand, in the magnetic recording medium of Comparative Example 3, a 0.5-nm thick Ag continuous film was formed on the Cu underlayer.

Furthermore, in the magnetic recording medium of Example 1, the magnetic recording layer was in contact with both the second and third underlayers.

Table 1 shows the evaluation results of the c-axis orientation dispersion $\Delta\theta 50$ of the magnetic recording layer, the order S, the average grain size dMag of the magnetic recording layer, the coercive force Hc, the medium SNR, the medium OW, and the medium thermal decay resistance $V_{1000}/V_0$ of each magnetic recording medium.

TABLE 1

| | $\Delta\theta_{50}$ (°) | S | dMag (nm) | $H_c$ (kOe) | SNR (dB) | OW (dB) | $V_{1000}/V_0$ |
|---|---|---|---|---|---|---|---|
| Example 1 | 5.2 | 0.8 | 50 | 6.5 | 18.2 | 30 | 0.995 |
| Comparative Example 1 | 5.1 | 0.79 | 52 | 0.5 | 6.2 | 50 | 0.312 |
| Comparative Example 2 | 5.1 | 0.79 | 51 | 0.4 | 5.5 | 50 | 0.201 |
| Comparative Example 3 | 5.2 | 0.8 | 49 | 0.6 | 6.0 | 50 | 0.405 |

The SNR of the magnetic recording medium of Example 1 was much higher than those of the media of Comparative Examples 1 to 3.

The coercive force of the magnetic recording medium of Example 1 was also much higher than those of other media. This is so presumably because pinning sites were formed in the magnetic recording layer by the third underlayer formed into islands. By contrast, any of the magnetic recording media of Comparative Examples 1 to 3 had a low coercive force, and had a domain wall displacement type magnetization reversing mechanism by which almost no domain wall pinning occurred.

The above results demonstrate that a magnetic recording medium having a high SNR, good OW characteristic, and high thermal decay resistance can be obtained by forming pinning sites in the magnetic recording layer having the continuous film structure by using the underlayer grown into islands.

EXAMPLE 2

Magnetic recording media were manufactured as follows by changing the grain filling ratio of the recording layer crystal grains.

The magnetic recording media were manufactured following the same procedures as in Example 1 except that the composition of the magnetic recording layer was changed to (Fe-45atomic % Pt)–xvol % $SiO_2$.

Various targets were formed by changing the content of $SiO_2$ in (Fe-45atomic % Pt)–xvol % $SiO_2$, and magnetic recording layers were deposited by DC sputtering by using the (Fe-45atomic % Pt)–xvol % $SiO_2$ targets.

The $SiO_2$ addition amount x (vol %) was changed within the range of 1 to 30 vol %. Note that x=0 vol % is the same condition as that of Example 1.

Evaluation of Results Obtained by X-Ray Diffractometer (XRD)

In any magnetic recording medium, the crystal grains in the first underlayer were oriented in the (100) plane.

In any magnetic recording medium, the crystal grains in the magnetic recording layer had the $L1_0$ structure and were (001)-oriented.

In any magnetic recording medium, the soft magnetic layer was amorphous.

In any magnetic recording medium, the amorphous seed layer was amorphous.

Results of SIMS

In any magnetic recording medium, a layer containing Cu and N as main components existed between the Cu underlayer and its upper layer.

Results of Cross-Section TEM Observation

In any magnetic recording medium, a 1-nm thick layer having a different contrast was formed on the Cu underlayer. Also, in any magnetic recording medium, Ag grains having an average grain size of 4 nm were intermittently formed into islands at an average pitch of about 5 nm between the above-mentioned layer having a different contrast and the magnetic recording layer.

Furthermore, in any magnetic recording medium, the magnetic recording layer was in contact with both the second and third underlayers.

Results of Plane TEM Observation

When the grain filling ratio was 70% (inclusive) to 90% (exclusive), the magnetic recording layer had the granular structure in which the crystal grains were surrounded by the grain boundary region. On the other hand, the magnetic recording layer had no clear granular structure when the grain filling ratio was 90% or more, and had the continuous film structure when the grain filling ratio was 95% or more.

Table 2 shows the evaluation results of the grain filling ratio in the magnetic recording layer obtained by plane TEM observation, the $SiO_2$ content x, the c-axis orientation dispersion $\Delta\theta 50$ of the magnetic recording layer, the order S, the average grain size dMag of the magnetic recording layer, the coercive force Hc, the medium SNR, the medium OW, and the medium thermal decay resistance $V_{1000}/V_0$.

TABLE 2

| $SiO_2$ addition amount (vol %) | Grain filling ratio (%) | $\Delta\theta_{50}$ (°) | S | dMag (nm) | $H_c$ (kOe) | SNR (dB) | OW (dB) | $V_{1000}/V_0$ |
|---|---|---|---|---|---|---|---|---|
| 0 | 99 | 5.2 | 0.8 | 50 | 6.5 | 18.2 | 30 | 0.995 |
| 1 | 98 | 5.2 | 0.8 | 50 | 6.5 | 18.2 | 30 | 0.995 |
| 2 | 97 | 5.3 | 0.8 | 48 | 6.4 | 18.1 | 31 | 0.994 |
| 4 | 95 | 5.5 | 0.79 | 48 | 6.4 | 18.0 | 31 | 0.994 |
| 6 | 93 | 5.5 | 0.78 | 45 | 5.0 | 15.0 | 38 | 0.812 |
| 10 | 90 | 5.7 | 0.75 | 40 | 5.0 | 14.9 | 38 | 0.810 |
| 15 | 85 | 5.9 | 0.73 | 25 | 5.1 | 11.8 | 40 | 0.702 |
| 20 | 80 | 6.0 | 0.7 | 20 | 4.2 | 11.5 | 40 | 0.699 |

TABLE 2-continued

| SiO$_2$ addition amount (vol %) | Grain filling ratio (%) | $\Delta\theta_{50}$ (°) | S | dMag (nm) | H$_c$ (kOe) | SNR (dB) | OW (dB) | V$_{1000}$/V$_0$ |
|---|---|---|---|---|---|---|---|---|
| 25 | 75 | 6.4 | 0.68 | 15 | 4.1 | 11.0 | 42 | 0.690 |
| 30 | 70 | 6.5 | 0.65 | 12 | 4.0 | 10.5 | 42 | 0.651 |
| 50 | 49 | 8.1 | 0.6 | 10 | 3.5 | 9.5 | 45 | 0.602 |

Table 2 shows that the SNR, OW, and thermal decay resistance are remarkably good when the grain filling ratio in the magnetic recording layer is 95% or more. Table 2 also reveals that the SNR and thermal decay resistance decreases when the magnetic recording layer has the granular structure, and noticeably increases when the magnetic recording layer has the continuous film structure.

EXAMPLE 3

Magnetic recording media were manufactured as follows by changing the substrate heating temperature.

The magnetic recording media were manufactured following the same procedures as in Example 1 except that the substrate heating temperature after the amorphous seed layer was deposited was changed within the range of 230° C. to 450° C.

Evaluation of Results Obtained by X-Ray Diffractometer (XRD)

In any magnetic recording medium, the crystal grains in the first underlayer were oriented in the (100) plane.

In any magnetic recording medium, the crystal grains in the magnetic recording layer had the L1$_0$ structure and were (001)-oriented.

In any magnetic recording medium, the soft magnetic layer was amorphous.

In any magnetic recording medium, the amorphous seed layer was amorphous.

Results of SIMS

In any magnetic recording medium, a layer containing Cu and N as main components existed between the Cu underlayer and its upper layer.

Results of Plane TEM Observation

The magnetic recording layer of any magnetic recording medium had the continuous film structure instead of the granular structure.

Results of Cross-Section TEM Observation

In any magnetic recording medium, a 1-nm thick layer having a different contrast was formed on the Cu underlayer.

Also, in any magnetic recording medium, Ag grains having an average grain size of about 4 nm were intermittently formed into islands at an average pitch of about 5 nm between the above-mentioned layer having a different contrast and the magnetic recording layer.

Furthermore, in any magnetic recording medium, the magnetic recording layer was in contact with both the second and third underlayers.

Table 3 shows the evaluation results of the c-axis orientation dispersion Δθ50 of the magnetic recording layer, the order S, the average grain size dCu of the first underlayer, the average grain size dMag of the magnetic recording layer, the coercive force Hc, the medium SNR, the medium OW, and the medium thermal decay resistance V1000/V0.

TABLE 3

| Substrate temperature (°) | $\Delta\theta_{50}$ (°) | S | dCu (nm) | dMag (nm) | H$_c$ (kOe) | SNR (dB) | OW (dB) | V$_{1000}$/V$_0$ |
|---|---|---|---|---|---|---|---|---|
| 230 | 6.1 | 0.7 | 12 | 10 | 5.8 | 16.5 | 34 | 0.899 |
| 250 | 5.6 | 0.77 | 15 | 15 | 6.5 | 17.4 | 31 | 0.993 |
| 260 | 5.5 | 0.79 | 22 | 20 | 6.4 | 17.5 | 31 | 0.993 |
| 280 | 5.3 | 0.8 | 36 | 30 | 6.4 | 17.5 | 30 | 0.994 |
| 300 | 5.2 | 0.8 | 50 | 50 | 6.5 | 18.2 | 30 | 0.995 |
| 350 | 4.8 | 0.84 | 68 | 60 | 6.4 | 18.5 | 31 | 0.997 |
| 450 | 4.1 | 0.85 | 130 | 100 | 6.5 | 19.0 | 30 | 0.998 |

Table 3 reveals that when the average grain size of the magnetic crystal grains in the magnetic recording layer is 15 nm or more, a magnetic recording medium having a high SNR, good OW characteristic, and high thermal decay resistance can be obtained. Table 3 also shows that the SNR can further increase when the average grain size is 50 nm or more.

Table 3 reveals that when the average grain size of the magnetic crystal grains in the first underlayer is 15 nm or more, a magnetic recording medium having a high SNR, good OW characteristic, and high thermal decay resistance can be obtained. Table 3 also shows that the SNR can further increase when the average grain size is 50 nm or more.

EXAMPLE 4

Magnetic recording media were manufactured as follows by changing the time of reverse sputtering to the surface of the first underlayer.

The magnetic recording media were manufactured following the same procedures as those for the magnetic recording medium of Example 1 except that the time of reverse sputtering to the surface of the first underlayer was changed within the range of 0 to 60 sec. Note that a magnetic recording medium for which the reverse sputtering time was 0 sec was the same condition as that of Comparative Example 3.

Evaluation of Results Obtained by X-Ray Diffractometer (XRD)

In any magnetic recording medium, the crystal grains in the first underlayer were oriented in the (100) plane.

In any magnetic recording medium, the crystal grains in the magnetic recording layer had the L1$_0$ structure and were (001)-oriented.

In any magnetic recording medium, the soft magnetic layer was amorphous.

In any magnetic recording medium, the amorphous seed layer was amorphous.

Results of Plane TEM Observation

The magnetic recording layer of any magnetic recording medium had the continuous film structure instead of the granular structure.

Results of SIMS

In each magnetic recording medium for which the reverse sputtering time was 1 sec or more, a layer containing Cu and N as main components existed between the Cu underlayer and its upper layer. By contrast, no such layer was found in the magnetic recording medium for which the reverse sputtering time was 0 sec.

Results of Cross-Section TEM Observation

In each magnetic recording medium for which the reverse sputtering time was 1 sec or more, a layer having a different contrast was formed on the Cu underlayer. On the other hand, no such layer was found in the magnetic recording medium for which the reverse sputtering time was 0 sec.

Also, in each magnetic recording medium for which the reverse sputtering time was 1 sec or more, Ag grains were intermittently formed into islands between the above-mentioned layer having a different contrast and the magnetic recording layer. On the other hand, in the magnetic recording medium for which the reverse sputtering time was 0 sec, a 0.5-nm thick Ag continuous film was formed on the Cu underlayer. Furthermore, in each magnetic recording medium for which the reverse sputtering time was 1 sec or more, the magnetic recording layer was in contact with both the second and third underlayers.

Table 4 shows the evaluation results of the second underlayer film thickness obtained by plane TEM observation, the c-axis orientation dispersion $\Delta\theta50$ of the magnetic recording layer, the order S, the average grain size dMag of the magnetic recording layer, the coercive force Hc, the medium SNR, the medium OW, and the medium thermal decay resistance V1000/V0.

In any magnetic recording medium, the crystal grains in the magnetic recording layer had the $L1_0$ structure and were (001)-oriented.

In any magnetic recording medium, the soft magnetic layer was amorphous.

In any magnetic recording medium, the amorphous seed layer was amorphous.

Results of Plane TEM Observation

The magnetic recording layer of any magnetic recording medium had the continuous film structure instead of the granular structure.

Results of SIMS

In any magnetic recording medium, a layer containing Cu and N as main components existed between the Cu underlayer and its upper layer.

Results of Cross-Section TEM Observation

In any magnetic recording medium, a 1-nm thick layer having a different contrast was formed on the Cu underlayer.

TABLE 4

| Reverse sputtering time | Second underlayer film thickness (nm) | $\Delta\theta_{50}$ (°) | S | dMag (nm) | $H_c$ (kOe) | SNR (dB) | OW (dB) | $V_{1000}/V_0$ |
|---|---|---|---|---|---|---|---|---|
| Comparative Example 3 | 0 | 5.2 | 0.8 | 49 | 0.6 | 6.0 | 50 | 0.405 |
| 1 (sec) | 0.1 | 5.3 | 0.8 | 49 | 5.1 | 16.9 | 44 | 0.991 |
| 2 (sec) | 0.5 | 5.2 | 0.81 | 50 | 5.5 | 17.0 | 40 | 0.992 |
| 4 (sec) | 1.0 | 5.1 | 0.81 | 49 | 6.0 | 18.0 | 35 | 0.995 |
| Example 1 | 1.5 | 5.2 | 0.8 | 50 | 6.5 | 18.2 | 30 | 0.995 |
| 10 (sec) | 2.0 | 5.2 | 0.79 | 49 | 6.4 | 18.0 | 35 | 0.995 |
| 15 (sec) | 2.5 | 5.5 | 0.81 | 45 | 5.7 | 17.1 | 38 | 0.992 |
| 20 (sec) | 3.0 | 5.7 | 0.79 | 40 | 5.5 | 17.1 | 40 | 0.992 |
| 25 (sec) | 3.5 | 7.0 | 0.71 | 20 | 4.1 | 15.1 | 45 | 0.890 |
| 30 (sec) | 4.0 | 7.5 | 0.7 | 21 | 3.9 | 15.0 | 46 | 0.880 |

Table 4 reveals that the SNR and thermal decay resistance are remarkably high when the second underlayer film thickness is 0.1 to 3 nm, and further increases when the second underlayer film thickness is 1 to 2 nm. Table 4 also demonstrates that the third underlayer is intermittently formed into islands when the second underlayer exists, and formed into a continuous film when no second underlayer exists.

EXAMPLE 5

Magnetic recording media were manufactured as follows by changing the deposition amount of the third underlayer.

The magnetic recording media were manufactured following the same procedures as in Example 1 except that the deposition time of the third underlayer was changed within the range of 1 to 25 sec.

Evaluation of Results Obtained by X-Ray Diffractometer (XRD)

In any magnetic recording medium, the crystal grains in the first underlayer were oriented in the (100) plane.

Also, in a magnetic recording medium for which the deposition time of the third underlayer was 1 to 6 sec, Ag grains were intermittently formed into islands between the above-mentioned layer having a different contrast and the magnetic recording layer. On the other hand, in a magnetic recording medium for which the deposition time was 30 sec, some Ag crystal grains aggregated, and the island structure almost broke and became close to the continuous film structure.

Furthermore, in a magnetic recording medium for which the deposition time of the third underlayer was 1 to 6 sec, the magnetic recording layer was in contact with both the second and third underlayers.

Table 5 shows the evaluation results of the third underlayer grain size obtained by plane TEM observation, the c-axis orientation dispersion $\Delta\theta50$ of the magnetic recording layer, the order S, the average grain size dMag of the magnetic recording layer, the coercive force Hc, the medium SNR, the medium OW, and the medium thermal decay resistance V1000/V0.

TABLE 5

| Deposition time (sec) | Third underlayer grain size (nm) | $\Delta\theta_{50}$ (°) | S | dMag (nm) | $H_c$ (kOe) | SNR (dB) | OW (dB) | $V_{1000}/V_0$ |
|---|---|---|---|---|---|---|---|---|
| Comparative Example 2 | — | 5.2 | 0.8 | 49 | 0.6 | 6.0 | 50 | 0.405 |
| 1 (sec) | 0.5 | 5.1 | 0.81 | 49 | 3.1 | 15.1 | 41 | 0.824 |
| 2 (sec) | 1 | 5.2 | 0.8 | 50 | 4.8 | 17.2 | 37 | 0.990 |
| 5 (sec) | 2 | 5.1 | 0.79 | 49 | 5.0 | 17.3 | 35 | 0.991 |
| 7 (sec) | 3 | 5.2 | 0.81 | 50 | 6.1 | 18.1 | 31 | 0.994 |
| Example 1 | 4 | 5.2 | 0.8 | 50 | 6.5 | 18.2 | 30 | 0.995 |
| 15 (sec) | 5 | 5.2 | 0.82 | 50 | 6.7 | 17.3 | 29 | 0.996 |

TABLE 5-continued

| Deposition time (sec) | Third underlayer grain size (nm) | $\Delta\theta_{50}$ (°) | S | dMag (nm) | $H_c$ (kOe) | SNR (dB) | OW (dB) | $V_{1000}/V_0$ |
|---|---|---|---|---|---|---|---|---|
| 20 (sec) | 5.5 | 4.9 | 0.85 | 60 | 3.9 | 15.3 | 40 | 0.846 |
| 25 (sec) | 6 | 4.8 | 0.86 | 65 | 2.1 | 15.0 | 45 | 0.788 |
| 35 (sec) | 8 | 4.1 | 0.87 | 79 | 1.2 | 10.5 | 48 | 0.502 |

Table 5 indicates that the SNR and thermal decay resistance are notably high when the third underlayer grain size is 1 to 5 nm, and further increase when the third underlayer grain size is 3 to 4 nm. Table 5 also shows that when the island structure of the third underlayer breaks and becomes close to the continuous film structure, the Hc and SNR deteriorate. This is so perhaps because the domain wall pinning effect of the island structure of the third underlayer decreases.

EXAMPLE 6

Magnetic recording media were manufactured as follows by changing the material of the third underlayer.

The magnetic recording media were manufactured following the same procedures as in Example 1 except that the material of the third underlayer was changed to Au, Ir, Fe, or Co.

Evaluation of Results Obtained by X-Ray Diffractometer (XRD)

In any magnetic recording medium, the crystal grains in the first underlayer were oriented in the (100) plane.

In any magnetic recording medium, the crystal grains in the magnetic recording layer had the $L1_0$ structure and were (001)-oriented.

In any magnetic recording medium, the soft magnetic layer was amorphous.

In any magnetic recording medium, the amorphous seed layer was amorphous.

Results of SIMS

In any magnetic recording medium, a layer containing Cu and N as main components existed between the Cu underlayer and its upper layer.

Results of Plane TEM Observation

The magnetic recording layer of any magnetic recording medium had the continuous film structure instead of the granular structure.

Results of Cross-Section TEM Observation

In any magnetic recording medium, a 1-nm thick layer having a different contrast was formed on the Cu underlayer. Also, in any magnetic recording medium, the third underlayer was intermittently formed into islands between the above-mentioned layer having a different contrast and the magnetic recording layer.

Furthermore, in any magnetic recording medium, the magnetic recording layer was in contact with both the second and third underlayers.

Table 6 shows the evaluation results of the third underlayer grain size obtained by plane TEM observation, the c-axis orientation dispersion Δθ50 of the magnetic recording layer, the order S, the average grain size dMag of the magnetic recording layer, the coercive force Hc, the medium SNR, the medium OW, and the medium thermal decay resistance V1000/V0.

TABLE 6

| Third underlayer | Third underlayer grain size (nm) | $\Delta\theta_{50}$ (°) | S | dMag (nm) | $H_c$ (kOe) | SNR (dB) | OW (dB) | $V_{1000}/V_0$ |
|---|---|---|---|---|---|---|---|---|
| Example 1 | 4 | 5.2 | 0.8 | 50 | 6.5 | 18.2 | 30 | 0.995 |
| Au | 3.5 | 5.1 | 0.78 | 51 | 6.0 | 17.5 | 32 | 0.991 |
| Ir | 3.1 | 4.8 | 0.77 | 50 | 6.0 | 17.5 | 32 | 0.990 |
| Fe | 3.0 | 5.3 | 0.75 | 48 | 5.5 | 17.0 | 34 | 0.895 |
| Co | 3.0 | 5.6 | 0.75 | 47 | 5.5 | 17.0 | 34 | 0.890 |

Table 6 demonstrates that when using Ag, Au, Ir, Fe, or Co as the third underlayer material, the material intermittently grows into islands on the second underlayer, so a magnetic recording medium having a high SNR, good OW characteristic, and high thermal decay resistance can be obtained.

EXAMPLE 7

Magnetic recording media were manufactured as follows by forming a fourth underlayer between the third underlayer and magnetic recording layer.

The magnetic recording media were manufactured following the same procedures as in Example 1 except that Pt or Pd having a film thickness of 1 to 20 nm was deposited after the third underlayer was deposited.

Evaluation of Results Obtained by X-Ray Diffractometer (XRD)

In any magnetic recording medium, the crystal grains in the first underlayer were oriented in the (100) plane.

In any magnetic recording medium, the fourth underlayer was oriented in the (100) plane.

In any magnetic recording medium, the crystal grains in the magnetic recording layer had the $L1_0$ structure and were (001)-oriented.

In any magnetic recording medium, the soft magnetic layer was amorphous.

In any magnetic recording medium, the amorphous seed layer was amorphous.

Results of SIMS

In any magnetic recording medium, a layer containing Cu and N as main components existed between the Cu underlayer and its upper layer.

Results of Plane TEM Observation

The magnetic recording layer of any magnetic recording medium had the continuous film structure instead of the granular structure.

Results of Cross-Section TEM Observation

In any magnetic recording medium, a 1-nm thick layer having a different contrast was formed on the Cu underlayer.

Also, in any magnetic recording medium, Ag grains having an average grain size of about 4 nm were intermittently formed into islands at an average pitch of about 5 nm between the above-mentioned layer having a different contrast and the fourth underlayer.

Furthermore, in any magnetic recording medium, the fourth underlayer was in contact with both the second and third underlayers.

Table 7 shows the evaluation results of the c-axis orientation dispersion $\Delta\theta 50$ of the magnetic recording layer, the order S, the average grain size dMag of the magnetic recording layer, the coercive force Hc, the medium SNR, the medium OW, and the medium thermal decay resistance V1000/V0.

TABLE 7

| Fourth underlayer | Fourth underlayer film thickness (nm) | $\Delta\theta_{50}$ (°) | S | dMag (nm) | $H_c$ (kOe) | SNR (dB) | OW (dB) | $V_{1000}/V_0$ |
|---|---|---|---|---|---|---|---|---|
| Example 1 | — | 5.2 | 0.8 | 50 | 6.5 | 18.2 | 30 | 0.995 |
| Pt | 1 | 5.2 | 0.85 | 55 | 6.6 | 18.5 | 30 | 0.996 |
| Pt | 3 | 5.0 | 0.90 | 60 | 6.8 | 19.0 | 29 | 0.997 |
| Pt | 5 | 4.9 | 0.90 | 68 | 6.8 | 19.1 | 29 | 0.997 |
| Pt | 10 | 4.6 | 0.92 | 72 | 6.8 | 19.2 | 29 | 0.998 |
| Pt | 15 | 4.5 | 0.93 | 81 | 6.9 | 18.6 | 28 | 0.997 |
| Pt | 20 | 4.0 | 0.94 | 88 | 6.9 | 17.5 | 28 | 0.997 |
| Pd | 1 | 5.1 | 0.83 | 53 | 6.5 | 18.6 | 30 | 0.996 |
| Pd | 3 | 4.9 | 0.87 | 58 | 6.7 | 18.9 | 29 | 0.997 |
| Pd | 5 | 4.7 | 0.88 | 65 | 6.8 | 18.9 | 28 | 0.998 |
| Pd | 10 | 4.6 | 0.88 | 69 | 6.8 | 18.8 | 28 | 0.997 |
| Pd | 15 | 4.4 | 0.89 | 75 | 6.7 | 18.0 | 29 | 0.997 |
| Pd | 20 | 4.0 | 0.9 | 80 | 6.9 | 17.0 | 28 | 0.998 |

Table 7 reveals that when using Pt or Pd as the fourth underlayer, the order of the magnetic recording layer crystal grains improves, and both the SNR and thermal decay resistance increase. Table 7 also shows that the SNR markedly increases when the fourth underlayer film thickness is 1 to 15 nm, and increases more when the fourth layer film thickness is 3 to 10 nm.

EXAMPLE 8

Magnetic recording media were manufactured as follows by changing the nonmagnetic orientation control layer.

After the soft magnetic layer was deposited in the same manner as in Example 1, the substrate surface was heated to 300° C. by using an infrared lamp heater. As the nonmagnetic orientation control layer, 10-nm thick Ni-50atomic % Al or MgO was deposited. After that, the first underlayer, second underlayer, third underlayer, magnetic recording layer, protective layer, and lubricating layer were sequentially formed following the same procedures as in Example 1, thereby obtaining each magnetic recording medium.

Evaluation of Results Obtained by X-Ray Diffractometer (XRD)

In any magnetic recording medium, the crystal grains in the first underlayer were oriented in the (100) plane.

In any magnetic recording medium, the crystal grains in the magnetic recording layer had the $L1_0$ structure and were (001)-oriented. In any magnetic recording medium, the soft magnetic layer was amorphous.

The NiAl seed layer had a CsCl type crystal structure, and was (100)-oriented.

The MgO seed layer had an NaCl type crystal structure, and was (100)-oriented.

Results of SIMS

In any magnetic recording medium, a layer containing Cu and N as main components existed between the Cu underlayer and its upper layer.

Results of Plane TEM Observation

The magnetic recording layer of any magnetic recording medium had the continuous film structure instead of the granular structure.

Results of Cross-Section TEM Observation

In any magnetic recording medium, a 1-nm thick layer having a different contrast was formed on the Cu underlayer.

Also, in any magnetic recording medium, Ag grains having an average grain size of about 4 nm were intermittently formed into islands at an average pitch of about 5 nm between the above-mentioned layer having a different contrast and the magnetic recording layer.

Furthermore, in any magnetic recording medium, the magnetic recording layer was in contact with both the second and third underlayers.

Table 8 shows the evaluation results of the third underlayer grain size obtained by plane TEM observation, the c-axis orientation dispersion $\Delta\theta 50$ of the magnetic recording layer, the order S, the average grain size dMag of the magnetic recording layer, the coercive force Hc, the medium SNR, the medium OW, and the medium thermal decay resistance V1000/V0.

TABLE 8

| Nonmagnetic orientation control layer | $\Delta\theta_{50}$ (°) | S | dMag (nm) | $H_c$ (kOe) | SNR (dB) | OW (dB) | $V_{1000}/V_0$ |
|---|---|---|---|---|---|---|---|
| NiAl | 5.8 | 0.75 | 41 | 5.4 | 17.1 | 36 | 0.993 |
| MgO | 6.0 | 0.73 | 35 | 4.8 | 17.1 | 35 | 0.990 |

Table 8 reveals that even when using NiAl or MgO as the nonmagnetic orientation control layer, a magnetic recording medium having a high SNR, good OW characteristic, and high thermal decay resistance can be obtained.

EXAMPLE 9

Magnetic recording media were manufactured as follows by changing the amorphous seed layer.

The magnetic recording media were manufactured following the same procedures as in Example 1 except that the amorphous seed layer was changed to Ni-40atomic % Nb, Ni-40atomic % Zr, Ni-40atomic % Mo, or Ni-40atomic % V. The amorphous seed layers were deposited at an input power of 1,000 W and an Ar pressure of 0.7 Pa by DC sputtering by preparing targets having different alloy compositions.

Evaluation of Results Obtained by X-Ray Diffractometer (XRD)

In any magnetic recording medium, the crystal grains in the first underlayer were oriented in the (100) plane.

In any magnetic recording medium, the crystal grains in the magnetic recording layer had the $L1_0$ structure and were (001)-oriented.

In any magnetic recording medium, the soft magnetic layer was amorphous.

In any magnetic recording medium, the amorphous seed layer was amorphous.

Results of SIMS

In any magnetic recording medium, a layer containing Cu and N as main components existed between the Cu underlayer and its upper layer.

Results of Plane TEM Observation

The magnetic recording layer of any magnetic recording medium had the continuous film structure instead of the granular structure.

Results of Cross-Section TEM Observation

In any magnetic recording medium, a 1-nm thick layer having a different contrast was formed on the Cu underlayer.

Also, in any magnetic recording medium, Ag grains having an average grain size of about 4 nm were intermittently formed into islands at an average pitch of about 5 nm between the above-mentioned layer having a different contrast and the magnetic recording layer.

Furthermore, in any magnetic recording medium, the magnetic recording layer was in contact with both the second and third underlayers.

Table 9 shows the evaluation results of the c-axis orientation dispersion $\Delta\theta 50$ of the magnetic recording layer, the order S, the average grain size dMag of the magnetic recording layer, the coercive force Hc, the medium SNR, the medium OW, and the medium thermal decay resistance V1000/V0.

TABLE 9

| Amorphous seed layer | $\Delta\theta_{50}$ (°) | S | dMag (nm) | $H_c$ (kOe) | SNR (dB) | OW (dB) | $V_{1000}/V_0$ |
|---|---|---|---|---|---|---|---|
| Example 1 | 5.2 | 0.8 | 50 | 6.5 | 18.2 | 30 | 0.995 |
| NiNb | 5.1 | 0.78 | 45 | 6.4 | 18.3 | 31 | 0.991 |
| NiZr | 5.0 | 0.78 | 44 | 6.4 | 18.4 | 31 | 0.991 |
| NiMo | 5.2 | 0.82 | 53 | 6.6 | 18.5 | 30 | 0.899 |
| NiV | 5.2 | 0.83 | 55 | 6.4 | 18.4 | 32 | 0.899 |

Table 9 indicates that even when using Ni-40atomic % Nb, Ni-40atomic % Zr, Ni-40atomic % Mo, or Ni-40atomic % V as the amorphous seed layer, a magnetic recording medium having a high SNR, good OW characteristic, and high thermal decay resistance can be obtained.

EXAMPLE 10

Magnetic recording media were manufactured as follows by forming a fifth underlayer between the third and fourth underlayers.

After layers up to the third underlayer were formed in the same manner as in Example 1, a 5-nm thick Pt—Cu, Pt—Ag, Pt—Cr, Pd—Cu, Pd—Cr, or Pd—Ag alloy was deposited as the fifth underlayer. After that, the fourth underlayer, magnetic recording layer, protective layer, and lubricating layer were sequentially formed in the same manner as in Example 7, thereby obtaining each magnetic recording medium. Te fourth underlayer was made of Pt, and had a film thickness of 5 nm. The fifth underlayers were deposited at an input power of 1,000 W and an Ar pressure of 0.7 Pa by DC sputtering by preparing targets having different alloy compositions.

Evaluation of Results Obtained by X-Ray Diffractometer (XRD)

In any magnetic recording medium, the crystal grains in the first underlayer were oriented in the (100) plane.

In any magnetic recording medium, the crystal grains in the magnetic recording layer had the $L1_0$ structure and were (001)-oriented.

In any magnetic recording medium, the soft magnetic layer was amorphous.

In any magnetic recording medium, the amorphous seed layer was amorphous.

Results of SIMS

In any magnetic recording medium, a layer containing Cu and N as main components existed between the Cu underlayer and its upper layer.

Results of Plane TEM Observation

The magnetic recording layer of any magnetic recording medium had the continuous film structure instead of the granular structure.

Results of Cross-Section TEM Observation

In any magnetic recording medium, a 1-nm thick layer having a different contrast was formed on the Cu underlayer.

Also, in any magnetic recording medium, Ag grains having an average grain size of about 4 nm were intermittently formed into islands at an average pitch of about 5 nm between the above-mentioned layer having a different contrast and the magnetic recording layer.

Furthermore, in any magnetic recording medium, the fifth underlayer was in contact with both the second and third underlayers.

Table 10 shows the evaluation results of the c-axis orientation dispersion $\Delta\theta 50$ of the magnetic recording layer, the order S, the average grain size dMag of the magnetic recording layer, the coercive force Hc, the medium SNR, the medium OW, and the medium thermal decay resistance V1000/V0, when the fifth underlayer was the Pt—Cu alloy. Note that a medium in which the fifth underlayer material was Pt was the same as the medium of Example 7.

TABLE 10

| Fifth underlayer | $\Delta\theta_{50}$ (°) | S | dMag (nm) | $H_c$ (kOe) | SNR (dB) | OW (dB) | $V_{1000}/V_0$ |
|---|---|---|---|---|---|---|---|
| Pt | 4.6 | 0.92 | 72 | 6.8 | 19.2 | 29 | 0.998 |
| Pt—15%Cu | 4.2 | 0.90 | 71 | 7.0 | 19.7 | 29 | 0.997 |
| Pt—30%Cu | 3.5 | 0.90 | 72 | 7.1 | 20.3 | 29 | 0.997 |
| Pt—45%Cu | 3.3 | 0.92 | 72 | 7.0 | 20.6 | 29 | 0.998 |
| Pt—60%Cu | 3.6 | 0.93 | 73 | 7.1 | 20.2 | 28 | 0.997 |
| Pt—75%Cu | 4.1 | 0.94 | 71 | 7.0 | 19.7 | 28 | 0.997 |
| Cu | 4.8 | 0.90 | 74 | 6.9 | 19.0 | 29 | 0.996 |

Table 10 demonstrates that when using the Pt—Cu alloy as the fifth underlayer between the third and fourth underlayers, the c-axis orientation dispersion Δθ50 and SNR can improve. Table 10 also reveals that the effect of improving the Δθ50 value and SNR is remarkable when the Pt or Pd content in the alloy is 30 to 60 atomic %. Note that the same effect was obtained when using the Pt—Ag, Pt—Cr, Pd—Cu, Pd—Cr, and Pd—Ag alloys.

EXAMPLE 11

Magnetic recording media were manufactured as follows by forming a fourth underlayer between the third underlayer and magnetic recording layer.

The magnetic recording media were manufactured following the same procedures as in Example 1 except that MgO, NiO, or TiN having a film thickness of 0.5 to 15 nm was deposited after the third underlayer was deposited. Note that MgO, NiO, and TiN were deposited at an Ar pressure of 2.0 Pa by RF sputtering by respectively using MgO, NiO, and TiN targets. The input power to each target was 800 W.

Evaluation of Results Obtained by X-Ray Diffractometer (XRD)

In any magnetic recording medium, the crystal grains in the first underlayer were oriented in the (100) plane.

In any magnetic recording medium, the fourth underlayer was oriented in the (100) plane.

In any magnetic recording medium, the crystal grains in the magnetic recording layer had the $L1_0$ structure and were (001)-oriented.

In any magnetic recording medium, the soft magnetic layer was amorphous.

In any magnetic recording medium, the amorphous seed layer was amorphous.

Results of SIMS

In any magnetic recording medium, a layer containing Cu and N as main components existed between the Cu underlayer and its upper layer.

Also, in the magnetic recording medium, the fourth underlayer film of which has a thickness of less than 1 nm, Cu diffusion to the magnetic recording layer was found. On the other hand, in the magnetic recording medium, the fourth underlayer film of which has a thickness of 1 nm or more, Cu diffusion to the magnetic recording layer was not found.

Results of Plane TEM Observation

The magnetic recording layer of any magnetic recording medium had the continuous film structure instead of the granular structure.

Results of Cross-Section TEM Observation

It was found that in any magnetic recording medium, a 1-nm thick layer having a different contrast was formed on the Cu underlayer.

It was also found that in any magnetic recording medium, Ag grains having an average grain size of about 4 nm were intermittently formed into islands at an average pitch of about 5 nm between the above-mentioned layer having a different contrast and the fourth underlayer.

Furthermore, it was found that in any magnetic recording medium, the fourth underlayer was in contact with both the second and third underlayers.

Table 11 shows the evaluation results of the c-axis orientation dispersion Δθ50 of the magnetic recording layer, the order S, the average grain size dMag of the magnetic recording layer, the coercive force Hc, the medium SNR, the medium OW, and the medium thermal decay resistance V1000/V0.

TABLE 11

| Fourth underlayer | Fourth underlayer film thickness (nm) | $\Delta\theta_{50}$ (°) | S | dMag (nm) | $H_c$ (kOe) | SNR (dB) | OW (dB) | $V_{1000}/V_0$ |
|---|---|---|---|---|---|---|---|---|
| Example 1 | — | 5.2 | 0.8 | 50 | 6.5 | 18.2 | 30 | 0.995 |
| MgO | 0.5 | 5.2 | 0.85 | 55 | 7.0 | 18.6 | 28 | 0.996 |
| MgO | 1 | 5.2 | 0.85 | 56 | 7.8 | 18.9 | 27 | 0.998 |
| MgO | 2 | 5.2 | 0.86 | 56 | 8.8 | 19.3 | 25 | 0.999 |
| MgO | 5 | 5.3 | 0.88 | 58 | 8.8 | 19.3 | 25 | 0.999 |
| MgO | 10 | 6.1 | 0.85 | 59 | 8.3 | 18.9 | 26 | 0.998 |
| MgO | 15 | 6.8 | 0.81 | 59 | 8.3 | 18.0 | 26 | 0.998 |
| NiO | 0.5 | 5.3 | 0.83 | 53 | 6.8 | 18.4 | 30 | 0.995 |
| NiO | 1 | 5.3 | 0.87 | 53 | 7.2 | 18.8 | 29 | 0.997 |
| NiO | 2 | 5.4 | 0.87 | 53 | 8.1 | 18.9 | 28 | 0.998 |
| NiO | 5 | 5.4 | 0.87 | 55 | 8.1 | 18.9 | 28 | 0.998 |
| NiO | 10 | 6.2 | 0.86 | 56 | 7.3 | 18.5 | 29 | 0.997 |
| NiO | 15 | 6.7 | 0.85 | 57 | 7.1 | 18.0 | 29 | 0.997 |
| TiN | 0.5 | 5.5 | 0.82 | 51 | 7.0 | 18.3 | 30 | 0.996 |
| TiN | 1 | 5.5 | 0.83 | 53 | 7.8 | 18.7 | 29 | 0.997 |
| TiN | 2 | 5.6 | 0.83 | 53 | 8.1 | 18.9 | 29 | 0.998 |
| TiN | 5 | 5.6 | 0.84 | 53 | 8.2 | 18.9 | 29 | 0.998 |
| TiN | 10 | 6.6 | 0.83 | 55 | 7.5 | 18.5 | 29 | 0.997 |
| TiN | 15 | 6.9 | 0.83 | 57 | 7.3 | 18.1 | 29 | 0.996 |

Table 11 reveals that when using MgO, NiO and TiN as the fourth underlayers, the Hc of the magnetic recording layer crystal grains improves. This is because the result of suppressing the diffusion of Cu improves the Ku of the magnetic recording layer crystal grains. This also makes it possible to obtain a magnetic recording medium having a high SNR and a high thermal decay resistance. Table 11 also shows that the SNR markedly increases when the fourth underlayer film thickness is 1 to 10 nm, and increases more when the fourth layer film thickness is 2 to 5 nm.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium comprising:
a substrate;
a soft magnetic layer formed on the substrate;
a multilayered underlayer including
   a first underlayer formed on the soft magnetic layer, made of copper, and containing crystal grains having a (100)-oriented, face-centered cubic lattice structure,
   a second underlayer formed on the first underlayer and made of copper and nitrogen, and
   a third underlayer formed into islands on the second underlayer; and
a continuous film type magnetic recording layer formed on the multilayered underlayer, containing at least one element selected from the group consisting of iron and cobalt and at least one element selected from the group consisting of platinum and palladium, having an $L1_0$ structure, and mainly containing (001)-oriented magnetic crystal grains,
wherein an average crystal grain size of the crystal grains in the magnetic recording layer is not less than 15 nm.

2. The medium of claim 1, wherein a crystal grain filling ratio on a film surface of the magnetic recording layer is 95% to 100%.

3. The medium of claim 1, wherein an average crystal grain size of the first underlayer is not less than 15 nm.

4. The medium of claim 1, wherein the second underlayer is in contact with both the third underlayer and a layer formed in contact with the third underlayer.

5. The medium of claim 1, wherein the second underlayer has a thickness of 0.1 to 3 nm.

6. The medium of claim 1, wherein the third underlayer has an average crystal grain size of 1 to 5 nm.

7. The medium of claim 1, wherein the third underlayer contains crystal grains made of at least one metal selected from the group consisting of silver, gold, iridium, cobalt, and iron.

8. A magnetic recording medium comprising:
a substrate;
a soft magnetic layer formed on the substrate;
an amorphous seed layer formed on the soft magnetic layer, and containing at least one alloy selected from the group consisting of an Ni—Nb alloy, an Ni—Ta alloy, an Ni—Zr alloy, an Ni—Mo alloy, and an Ni—V alloy;
a nonmagnetic orientation control layer formed on the amorphous seed layer, and containing at least one material selected from the group consisting of NiAl, MgO, and chromium;
a multilayered underlayer including
   a first underlayer formed on the soft magnetic layer, made of copper, and containing crystal grains having a (100)-oriented, face-centered cubic lattice structure,
   a second underlayer formed on the first underlayer and made of copper and nitrogen, and
   a third underlayer formed into islands on the second underlayer; and
a continuous film type magnetic recording layer formed on the multilayered underlayer, containing at least one element selected from the group consisting of iron and cobalt and at lease one element selected from the group consisting of platinum and palladium having an $L1_0$ structure and mainly containing (001)-oriented magnetic crystal grains.

9. The medium of claim 8, wherein a crystal grain filling ratio on a film surface of the magnetic recording layer is 95% to 100%.

10. The medium of claim 8, wherein an average crystal grain size of the crystal grains in the magnetic recording layer is not less than 15 nm.

11. The medium of claim 8, wherein an average crystal grain size of the first underlayer is not less than 15 nm.

12. The medium of claim 8, wherein the second underlayer is in contact with both the third underlayer and a layer formed in contact with the third underlayer.

13. The medium of claim 8, wherein the second underlayer has a thickness of 0.1 to 3 nm.

14. The medium of claim 8, wherein the third underlayer has an average crystal grain size of 1 to 5 nm.

15. The medium of claim 8, wherein the third underlayer contains crystal grains made of at least one metal selected from the group consisting of silver, gold, iridium, cobalt, and iron.

16. A magnetic recording medium comprising:
a substrate;
a soft magnetic layer formed on the substrate;
a multilayered underlayer including
   a first underlayer formed on the soft magnetic layer, and made of copper, and containing crystal grains having a (100)-oriented, face-centered cubic lattice structure,
   a second underlayer formed on the first underlayer and made of copper and nitrogen,
   a third underlayer formed into islands on the second underlayer,
   a fourth underlayer formed on the third underlayer, made of at least one of platinum and palladium, and containing substantially (100)-oriented crystal grains, and
   a fifth underlayer formed between the fourth underlayer and the third underlayer, and made of an alloy containing one of platinum and palladium and at least one element selected from the group consisting of copper, chromium, and silver; and
a continuous film type magnetic recording layer formed on the multilayered underlayer, containing at least one element selected from the group consisting of iron and cobalt and at least one element selected from the group consisting of platinum and palladium having an $L1_0$ structure and mainly containing (001)-oriented magnetic crystal grains.

17. The medium of claim 16, wherein a crystal grain filling ratio on a film surface of the magnetic recording layer is 95% to 100%.

18. The medium of claim 16, wherein an average crystal grain size of the crystal grains in the magnetic recording layer is not less than 15 nm.

19. The medium of claim 16, wherein an average crystal grain size of the first underlayer is not less than 15 nm.

20. The medium of claim 16, wherein the second underlayer is in contact with both the third underlayer and a layer formed in contact with the third underlayer.

21. The medium of claim 16, wherein the second underlayer has a thickness of 0.1 to 3 nm.

22. The medium of claim 16, wherein the third underlayer has an average crystal grain size of 1 to 5 m.

23. The medium of claim 16, wherein the third underlayer contains crystal grains made of at least one metal selected from the group consisting of silver, gold, iridium, cobalt, and iron.

24. The medium of claim 16, wherein the fifth underlayer is made of an alloy containing 30 to 60 atomic% of one of platinum and palladium.

25. A magnetic recording medium comprising:
a substrate;
a soft magnetic layer formed on the substrate;
a multilayered underlayer including
a first underlayer formed on the soft magnetic layer, made of copper, and containing crystal grains having a (100)-oriented, face-centered cubic lattice structure,
a second underlayer formed on the first underlayer and made of copper and nitrogen,
a third underlayer formed into islands on the second underlayer, and
a fourth underlayer formed on the third underlayer, and containing crystal grains made of at least one material selected from the group consisting of (001)-oriented MgO, NiO, and TiN; and
a continuous film type magnetic recording layer formed on the multilayered underlayer, containing at least one element selected from the group consisting of iron and cobalt and at least one element selected from the group consisting of platinum and palladium having an $L1_0$ structure and mainly containing (001)-oriented magnetic crystal grains.

26. The medium of claim 25, wherein a crystal grain filling ratio on a film surface of the magnetic recording layer is 95% to 100%.

27. The medium of claim 25, wherein an average crystal grain size of the crystal grains in the magnetic recording layer is not less than 15 nm.

28. The medium of claim 25, wherein an average crystal grain size of the first underlayer is not less than 15 nm.

29. The medium of claim 25, wherein the second underlayer is in contact with both the third underlayer and a layer formed in contact with the third underlayer.

30. The medium of claim 25, wherein the second underlayer has a thickness of 0.1 to 3 nm.

31. The medium of claim 25, wherein the third underlayer has an average crystal grain size of 1 to 5 nm.

32. The medium of claim 25, wherein the third underlayer contains crystal grains made of at least one metal selected from the group consisting of silver, gold, iridium, cobalt, and iron.

33. The medium of claim 25, wherein the fourth underlayer has a film thickness of 2 to 5 nm.

34. A magnetic recording/reproduction apparatus comprising:
a magnetic recording medium comprising
a substrate,
a soft magnetic layer formed on the substrate,
a multilayered underlayer including
a first underlayer formed on the soft magnetic layer, made of copper, and containing crystal grains having a (100)-oriented, face-centered cubic lattice structure,
a second underlayer formed on the first underlayer and made of copper and nitrogen, and
a third underlayer formed into islands on the second underlayer, and
a continuous film type magnetic recording layer formed on the multilayered underlayer, containing at least one element selected from the group consisting of iron and cobalt and at least one element selected from the group consisting of platinum and palladium, having an $L1_0$ structure, and mainly containing (001)-oriented magnetic crystal grains; and
a recording/reproduction head,
wherein an average crystal grain size of the crystal grains in the magnetic recording layer is not less than 15 nm.

35. A magnetic recording/reproduction apparatus comprising:
a magnetic recording medium comprising
a substrate,
a soft magnetic layer formed on the substrate, an amorphous seed layer formed on the soft magnetic layer, and containing at least one alloy selected from the group consisting of an Ni—Nb alloy, an Ni—Ta alloy, an Ni—Zr alloy, an Ni—Mo alloy, and an Ni—V alloy;
a nonmagnetic orientation control layer formed on the amorphous seed layer, and containing at least one material selected from the group consisting of NiAl, MgO, and chromium,
a multilayered underlayer including
a first underlayer formed on the soft magnetic layer, made of copper, and containing crystal grains having a (100)-oriented, face-centered cubic lattice structure,
a second underlayer formed on the first underlayer and made of copper and nitrogen, and
a third underlayer formed into islands on the second underlayer, and
a continuous film type magnetic recording layer formed on the multilayered underlayer, containing at least one element selected from the group consisting of iron and cobalt and at least one element selected from the group consisting of platinum and palladium, having an $L1_0$ structure, and mainly containing (001)-oriented magnetic crystal grains; and
a recording/reproduction head.

36. A magnetic recording/reproduction apparatus comprising:
a magnetic recording medium comprising
a substrate,
a soft magnetic layer formed on the substrate,
a multilayered underlayer including
a first underlayer formed on the soft magnetic layer, made of copper, and containing crystal grains having a (100)-oriented, face-centered cubic lattice structure,
a second underlayer formed on the first underlayer and made of copper and nitrogen,
a third underlayer formed into islands on the second underlayer,
a fourth underlayer formed on the third underlayer, made of at least one of platinum and palladium, and containing substantially (100)-oriented crystal grains, and a fifth underlayer formed between the fourth underlayer and the third underlayer, and made of an alloy containing one of platinum and palladium and at least one element selected from the group consisting of copper, chromium, and silver;
a continuous film type magnetic recording layer formed on the multilayered underlayer, containing at least one element selected from the group consisting of iron and cobalt and at least one element selected from the group consisting of platinum and palladium having an $L1_0$ structure and mainly containing (001)-oriented magnetic crystal grains; and
a recording/reproduction head.

37. A magnetic recording/reproduction apparatus comprising:
a magnetic recording medium comprising
a substrate,
a soft magnetic layer formed on the substrate,
a multilayered underlayer including a first underlayer formed on the soft magnetic layer, made of copper, and containing crystal grains having a (100)-oriented, face-centered cubic lattice structure, a second underlayer formed on the first underlayer and made of copper and nitrogen, a third underlayer formed into islands on the second underlayer, and a fourth underlayer formed on the third layer, and containing crystal grains made of at least one material selected from the group consisting of (001)-oriented MgO, NiO, and TiN: and a continuous film type magnetic recording layer formed on the multilayered underlayer, containing at least one element selected from the group consisting of iron and cobalt and at least one element selected from the group consisting of platinum and palladium, haying an $L1_0$ structure, and mainly containing (001)-oriented magnetic crystal grains; and a recording/reproduction head.

* * * * *